United States Patent [19]  [11] 4,414,656
Hepp  [45] Nov. 8, 1983

[54] WELL LOGGING SYSTEM FOR MAPPING STRUCTURAL AND SEDIMENTARY DIPS OF UNDERGROUND EARTH FORMATIONS

[75] Inventor: Vincent R. Hepp, Ridgefield, Conn.

[73] Assignee: Schlumberger Technology Corporation, New York, N.Y.

[21] Appl. No.: 140,578

[22] Filed: Apr. 15, 1980

[51] Int. Cl.³ .......................... G01V 1/40; G01V 1/30
[52] U.S. Cl. .................................... 367/25; 367/33; 364/422
[58] Field of Search ................ 367/25, 33; 364/422; 33/1 R, 303; 175/50; 73/151; 181/102

[56] References Cited

U.S. PATENT DOCUMENTS

| | | | |
|---|---|---|---|
| 3,256,480 | 6/1966 | Rurge et al. | 364/422 |
| 3,590,228 | 6/1971 | Burke | 364/422 |
| 3,691,518 | 9/1972 | Schuster | 367/33 |
| 3,916,372 | 10/1975 | Elliott | 367/33 |
| 4,174,577 | 11/1979 | Lewis | 364/422 |
| 4,293,933 | 10/1981 | Park et al. | 367/35 |
| 4,348,748 | 9/1982 | Clavier et al. | 364/422 |

FOREIGN PATENT DOCUMENTS

| | | | |
|---|---|---|---|
| 1417741 | 12/1975 | United Kingdom | 364/422 |
| 1468351 | 3/1977 | United Kingdom | 364/422 |

OTHER PUBLICATIONS

Hepp et al, "Cluster-a Method . . . Surveys", 10/1/75, 56th Mtg. of Soc. of Pet. Eng. of AIME.
"Log Enterpretation, vol. II-Applications", 1974, Schlumberger, pp. 13-17.
"Fundamentals of Dipmeter Enterpretation", 1970, pp. 29, 61, Schlumberger.
IBM, "Dipmeter Log Processing", 12/4/72, pp. 1-9.

Primary Examiner—Nelson Moskowitz

[57] ABSTRACT

Disclosed is a well logging system using the output of a dipmeter tool, preferably a three or more trace tool, to produce a map showing at least one or more of the following characteristics of the earth formations surrounding a borehole: the location of a depth zone in which the formation dips are mutually consistent within defined criteria, the structural dip within a zone, the formation dips within a zone rotated to account for the shown structural dip of the zone, the confidence limits of the magnitude and azimuth of a shown structural dip and an azimuth frequency polar histogram of the dips within a zone. In addition, the system identifies sedimentary patterns within a zone, such as blue and red patterns and shows their nature and characteristics.

42 Claims, 19 Drawing Figures

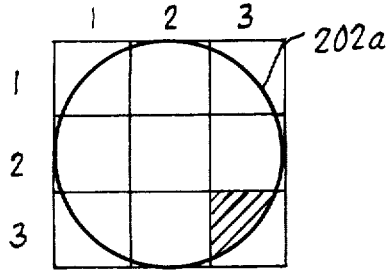
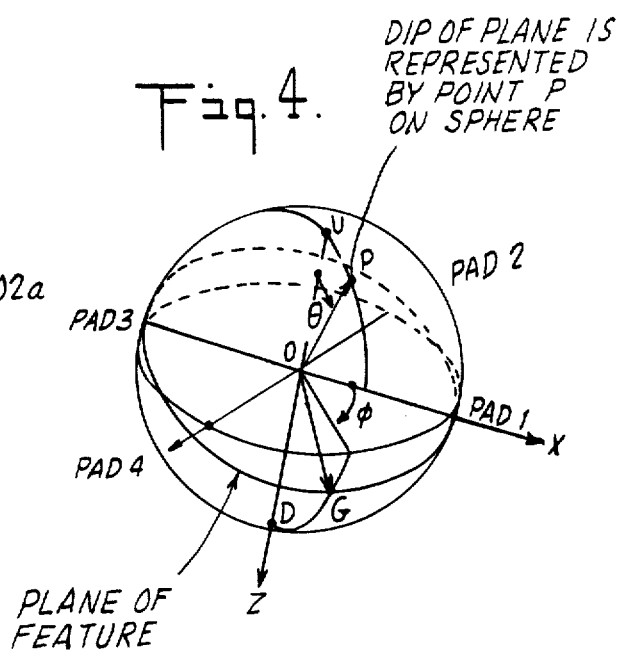
PLANE OF FEATURE
DIP OF PLANE IS REPRESENTED BY POINT P ON SPHERE
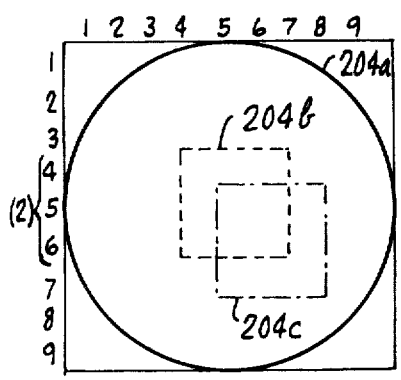
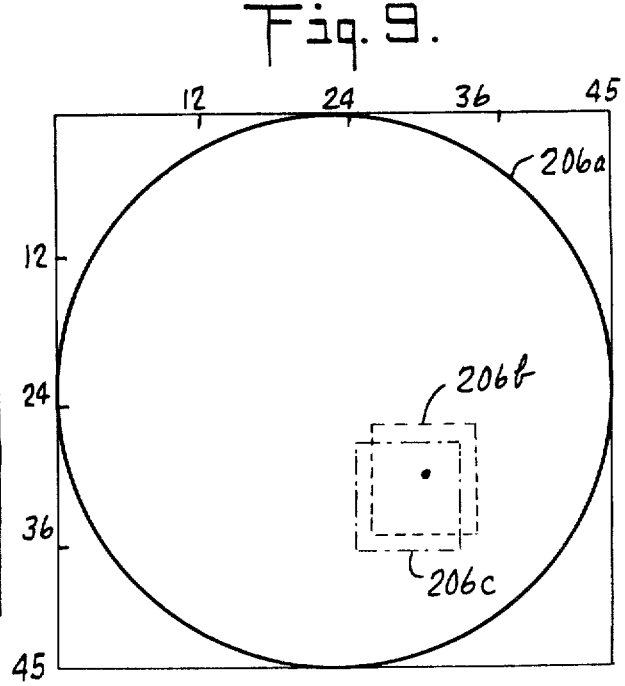

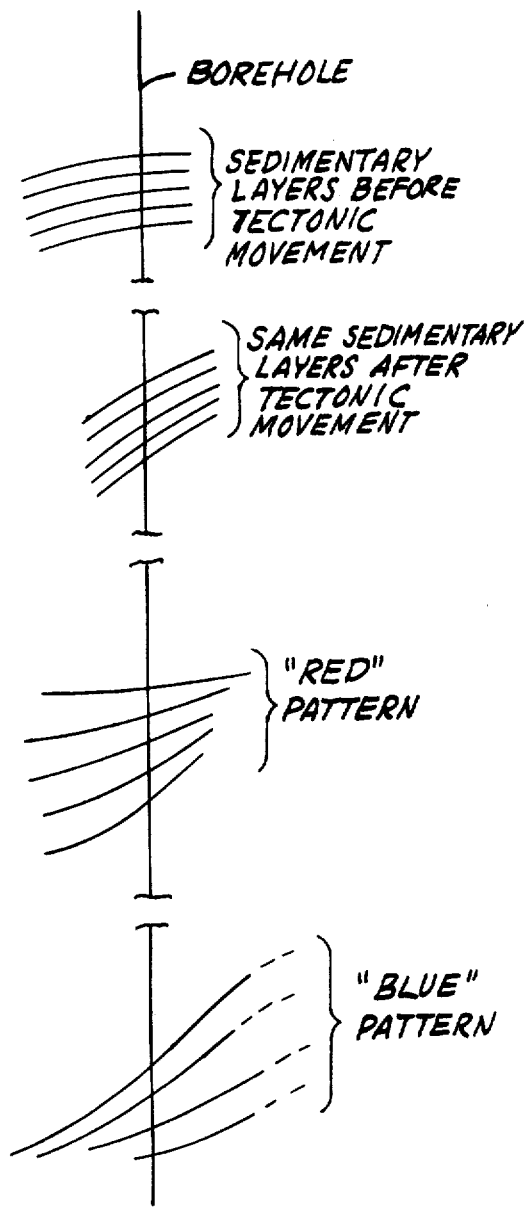
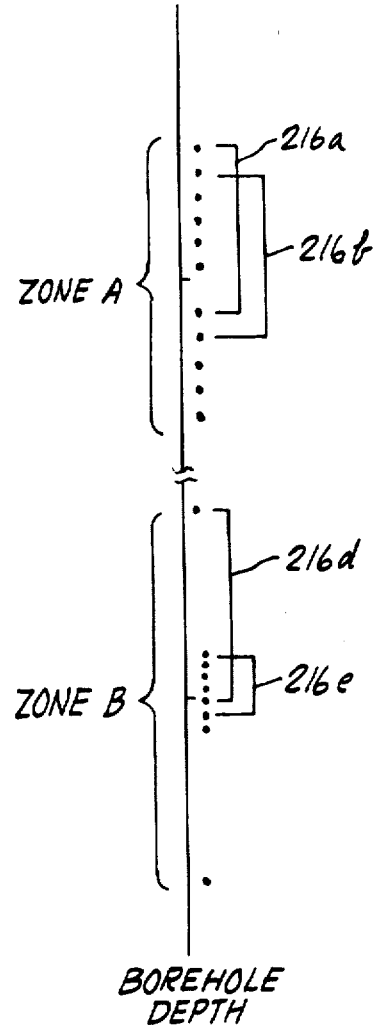

Fig. 16A.
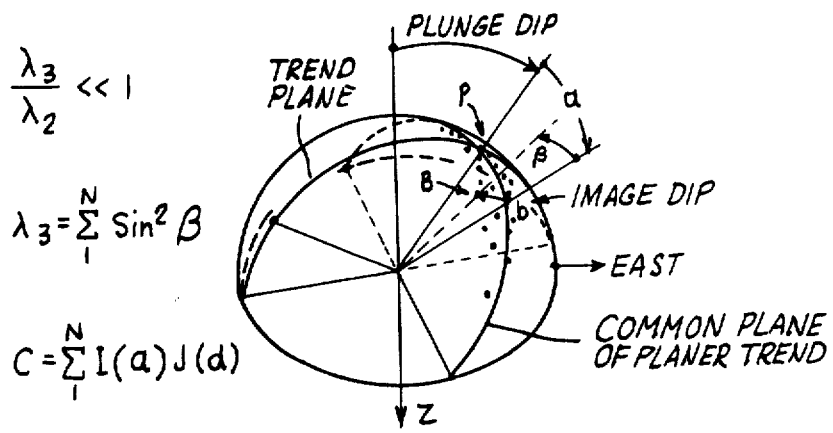
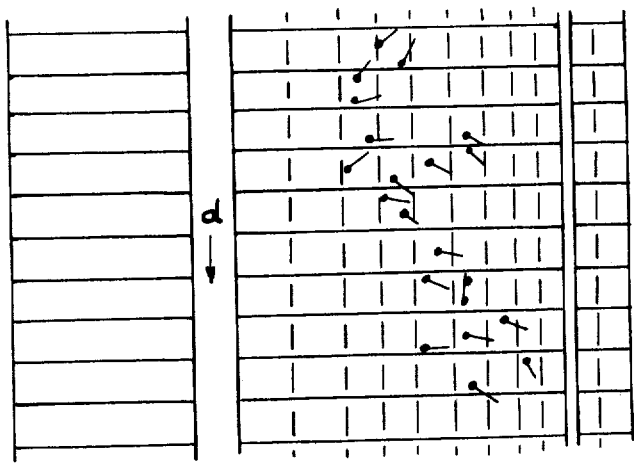

WELL LOGGING SYSTEM FOR MAPPING STRUCTURAL AND SEDIMENTARY DIPS OF UNDERGROUND EARTH FORMATIONS

DESCRIPTION

1. Background and Summary of the Invention

The invention is in the field of well logging and relates particularly to producing maps of underground earth formations in a way which enhances the showing of formation features which are believed most important in the search for hydrocarbons or other valuable underground resources.

One of the valuable aids in locating and exploiting underground resources such as oil and gas are maps of the attitudes of underground formations in the vicinity of a borehole. Variants of such maps are derived from the outputs of a dipmeter tool which is passed through a borehole in the earth formation and carries three or more well logging instruments which trace respective paths spaced from each other along the cirumference of the borehole. The outputs of these well logging instruments are combined in various ways (see, e.g., U.S. patent application Ser. No. 537,998, hereby incorporated by reference, filed on Dec. 30, 1974 in the name of C. Clavier, A. Dumestre and V. Hepp and assigned to the assignee of this invention now U.S. Pat. No. 4,348,748, granted on Sept. 7, 1982) so as to find formation dips at a succession of depths in the borehole, for example at each one-foot increment of the borehole. One common way of defining the dip of a plane intersecting the borehole is by way of two characteristics of a unit vector normal to that plane: the dip magnitude, which is the angle between the vertical and that unit vector, and dip azimuth, which is the angle in the horizontal plane measured clockwise (looking down in the borehole) between true north and the projection of that unit vector on the horizontal plane. A common way of showing such dips is on an arrow plot in which the vertical dimension is depth and the horizontal dimension is dip magnitude. The dips are shown on this plot as "tadpoles"—small circles with "tails" or lines emanating from them. The position of one of these small circles on the arrow plot shows the depth at which the dip occurs in the borehole and the dip magnitude while the direction of the tail emanating from the circle shows the dip azimuth.

One difficulty with the common arrow plot is that each tadpole shows the scrambled contribution of at least two different kinds of dips: structural dip and sedimentary dip. Structural dip can be thought of as dip resulting from tectonic movements, e.g., a common movement of many sedimentary layers, and sedimentary dip is associated with dip resulting from, for example, depositional or sedimentation processes as opposed to other planar events such as fractures. Particularly in the case of high definition dipmeter tools, where 50 or more dips may show per 100 feet of depth in an arrow plot, it is difficult to find the clues which are thought to be most useful in searching for and exploiting underground resources such as oil and gas. One example of a needed clue is sedimentary patterns, such as patterns due to deposition of layers from erosion events at different ages. Another example of a useful clue is the structural dip common to a number of sedimentary layers. Those clues, however, are difficult to extract from the common arrow plot because it does not identify the structural dip shared by a reasonably consistent succession of sedimentary layers, or of the dips of such a group of sedimentary layers after rotation to account for their common structural dip, or for that matter which group of formation dips corresponds to a group of sedimentary layers sharing a common structural dip.

Before this invention it had been common to seek such clues from arrow plots by way of subjective interpretation of their contents. Only a few experts have been considered competent in such a time-consuming process. Understandably, such process is believed to be prone to error and is not believed to be a reliable and efficient way to find a useful and accurate map of the characteristics of underground formations which are believed of greatest importance in the search for resources such as oil and gas.

In contrast, this invention makes it possible not only to map the underground formation dips more quickly, more accurately and more reliably than with the known prior art but also to produce a map of a kind that is not known to have been produced before—a map which expressly shows by way of a new kind and new juxtaposition of traces, characteristics of the underground formations which are believed to be the ones most needed in searching for and exploiting underground resources.

In accordance with one example of the invention, the output of a three or more trace dipmeter tool is used in a filtering process such as that described in the Clavier et al patent identified above, to find the depth, dip magnitude and dip azimuth of formation dips at a succession of depth levels in a borehole, and to associate each of these formation dips with a cell in a hemispherical equal area map. One way to visualize this collection of cells is to think of a hemisphere divided into some number of equal area cells. The radius of the hemisphere is a unit and the hemisphere is resting on a horizontal plane. Each unit vector representing a formation dip originates at the center of the hemisphere and ends at a point on the hemisphere. A unit vector representing a horizontal formation will end at a point on the top of the hemisphere and a unit vector representing a vertical formation will end at a point on the circumference of the hemisphere. The unit vectors representing formations having the same dip will end at the same point on the hemisphere. Of course a point on the hemisphere does not indicate the depth in the borehole at which a particular dip occurs; it only indicates the magnitude and azimuth of the dip. A dip can thus be identified by four characteristics: the depth at which it occurs, its dip magnitude angle, its dip azimuth angle, and the cell of the hemispherical collection of cells to which it belongs. The number of equal area cells on the hemisphere is arbitrary; in one example of this invention a 45 by 45 collection of cells is used.

The formation dips derived and characterized in this manner are then filtered into depth zones made up of dips which are mutually consistent within a zone. A depth zone can be thought of as portion of the borehole which is between a top depth and a bottom depth and contains formations having dips which are mutually consistent within a selected criteria. For example, a depth zone may contain formations which are associated with a string of dips which is nearly continuous and consists of dips which are the same within a selected tolerance. In this context, "nearly continuous" can mean, for example, that no two members of the string can be separated in depth by more than a preselected small number of dips which do not belong to the string and that the string should consist of at least a selected number of dips which belong to it. In physical terms it means a sequence of earth formations that tend to share a common structural dip, e.g., a pattern of sedimentary dips which have been rotated together in some tectonic movement.

In one example of the invention this filtering of the formation dips into depth zones involves first finding the zone which tends to be of best quality, i.e., tends to contain the most mutually consistent dips and tends to be the longest zone containing such dips. One way to do this is to pan through the hemispherical map in a way discussed in greater detail below so as to find the most populous 5 by 5 window of equal area cells, i.e., the window which contains the greatest number of points representing unit vectors of formation dips. The formation dips within this 5 by 5 cell window are further filtered into depth sequences, e.g., they are arranged by the depth at which the dips within the window occur in the borehole. These depth sequences are further filtered to find among them the longest sequence (string) which is an almost continuous one. For example, the arrangement by depth may be into cells of a depth histogram where each depth cell covers a selected number of feet of depth, say enough so it is likely that it covers about 5 to 10 consecutive dip levels. Then, two consecutive empty depth cells in this depth histogram arrangement may signify the end of one string and the beginning of another. The longest string found in this manner defines a depth zone.

In order to use the best quality formation dips within this zone so as to find the likely structural dip of the zone, the formation dips within the zone are further filtered to find among them the "trend dips", i.e., the dips within the zone which are believed to be most representative of the likely structural dip of that zone. One example of doing this is to pan the 5×5 window of the hemispherical map which produced the zone with a smaller, 2×2 window, so as to find the most populous position of that smaller window. The dips within this smaller window are believed to tend to be the most reliable indication of what the structural dip of the zone may be, and are considered to be "trend dips". These trend dips are combined with each other as described in more detail below to find a combined "trend dip" which tends to be indicative of the structural dip of the zone. The trend dip so found is then treated as the structural dip of the zone. Of course this structural dip, since it results from combining a number of trend dips, is not necessarily equal to any one of the trend dips, although the trend dips do tend to be within a close range of the structural dip by virtue of the technique described above. The probable error in the dip magnitude of the found structural dip is related to the dispersion figure of the trend dips on which it is based. If the structural dip is found by accumulating the three vector components (in Cartesian coordinates) of the trend dips, then the dispersion figure can be thought of as the arc cosine of the ratio of the length of the resultant to the number of vectors included in the accumulation. The probable error in the structural dip azimuth is a function of both the dispersion figure and the structural dip magnitude.

Trend dips should be represented throughout the zone to which they belong. Each fraction of the zone should contain a few representatives of the trend dip, i.e., a few participants in the 2×2 window used to define the trend dip area. If all participants were found to be grouped in one small fraction of the zone, leaving the larger fraction free of occurrence of trend dips, those participants could not be considered representative of the zone. In order to check for this the system finds a randomness measure by considering the average distance between pairs of trend dips chosen on either side of the median depth of the zone to which they belong and comparing it to half the length of the zone itself. If the ratio is unity, the degree of randomness is regarded as perfect. If the ratio is much smaller, participants are considered to be non-representative and the zone is rejected. The ratio could reach a maximum of two for only two participants happening to fall at the zone boundaries; this zone would also be rejected as containing too few participants to be representative.

The system may apply further criteria to the zone. As an example the length of a zone may have to exceed one depth histogram cell length; the number of trend dips in the zone must exceed an arbitrary minimum, such as five; and the randomness measure must exceed a minimum value such as 0.1. If the zone fails any of these criteria it may be discarded by the system and all the formation dips used in defining the zone released for consideration in finding other zones.

Once a zone has been defined and characterized as discussed above, the system resumes considering all dips in the equal area map except those belonging to formerly defined zones whether accepted or discarded. There is thus a progressive exhaustion of the population of the equal area map until no more than an arbitrary few are left. The identified zones may be arranged in some convenient order, such as in order of increasing depths. At this time a preliminary map may be produced showing, by way of map traces, the dip azimuths of the structural dips of the respective zones. The map may show the zone tops and bottoms related to borehole depth and the dip magnitude and dip azimuth of the structural dips within the zones. In addition, the same map or a separate printout may show various characteristics associated with the found and shown structural dips, such as the probable errors, the randomness measure, the number of depth levels included in each zone, the number of trend dips and other possible characteristics.

There may be, and typically are, gaps between the zones defined as described above. These gaps may include intervals of depth which were initial candidates to zones but were rejected for one of the three criteria already mentioned. They may be intervals where no clusters of formation dips could be found. This includes intervals where the structural dip would vary smoothly as well as intervals where it would vary chaotically and no discernible trend may be found. Such gaps may also be due to intervals where no formation dips exist. This includes intervals of zero thickness, i.e., of direct transition from one zone to another. Some possible treatments of such gaps are discussed in more detail below.

An important step used in the invention after finding the zones is to convert the original formation dips to rotated or relative dips. In this context, a rotated or relative dip is the dip within a zone as it would have been before the physical movement which resulted in the structural dip associated with the zone. For example, if a sedimentary layer was at one time horizontal but is not tilted due to a tectonic movement, the rotated or relative dip of that layer would be that of a horizontal plane. The rotated dips that relate to sedimentary layers thus tend to represent the attitudes of those layers before they were subjected to movements tha resulted in structural dip. In this manner, in accordance with the invention the effects of sedimentary dip and structural dip can be separated from each other.

Once rotated dips are available, the system can seek dip patterns in the respective depth zones which correspond to selected sedimentary patterns. For example a sedimentary pattern called a "red pattern" is characterized by sedimentary layers which have about the same dip azimuth but have dip magnitudes which increase the depth. Conversely, a sedimentary pattern called a "blue pattern" is characterized by sedimentary layers which have about the same dip azimuth but have dip magnitudes which tend to decrease with increasing depth in the borehole. The system seeks such patterns using a procedure similar to that used to pan through the equal area map of formation dips discussed in connection with finding zones. As one example, the number of occurrences of azimuth values are plotted on an azimuth frequency histogram and the most populous angular increment of the map is found. The depths of the dips in that increment are examined to find any sequence of two or more which are consecutive. If they are found to be so, their relative dip magnitudes are tested. If they are found to increase with depth, this is a "red pattern". If they are found to decrease with depth, they are a "blue pattern". A correlation measure may be found to cover intermediate cases. Once the dips belonging to the current most populous lobe or angular increment of the azimuth frequency plot have been so combined, the system resumes the same process for the participants in the next-most populous lobe of the plot, and so on until a lobe is found containing less than an arbitrary small number of dips, such as two dips.

At this time the system may produce the final map showing the results of separating structural dip from sedimentary dip and the results of finding sedimentary patterns. One example of such a map may be produced on arrow plot paper to show each zone as a vertical line drawn at the location of the found structural dip as measured on the dip magnitude grid of the arrow plot paper and extending from top to bottom of the zone to which it belongs. At the midpoint of this line a small circle may appear. Centered about this circle a horizontal bar shows the dispersion figure on dip magnitude of the structural dip and a fan of opening equal to the dispersion figure on dip azimuth is symetrically drawn with respect to the azimuth direction of the structural dip. In addition, the locations and characteristics of the found patterns of sedimentary dips may be shown in a convenient manner. As an alternative, in addition to the map traces discussed above, the map may show the individual dips after rotation, as conventional tadpole symbols on arrow plot paper but after accounting for the structural dip, and may show those that are associated with trend dips. Other traces may include azimuth frequency plots and perhaps the original formation dips on an adjacent, depth registered strip of arrow plot paper. The map may thus conveniently show at the same time both the structural and the sedimentary dip as well as the addition clues to the underground formation discussed above.

BRIEF DESCRIPTION OF THE DRAWINGS

FIG. 4 illustrates a hemispherical map and a unit dip vector.

FIGS. 7, 8 and 9 illustrate various equal area maps related to an explanation of steps 202, 204 and 206 of FIG. 6.

FIG. 13 illustrates simplified earth formation features intersecting a borehole.

FIG. 14 illustrates the depth locations of dips forming a zone.

FIG. 16A is an illustration of a hemispherical map plot of a planar trend.

DETAILED DESCRIPTION

Figure 1:
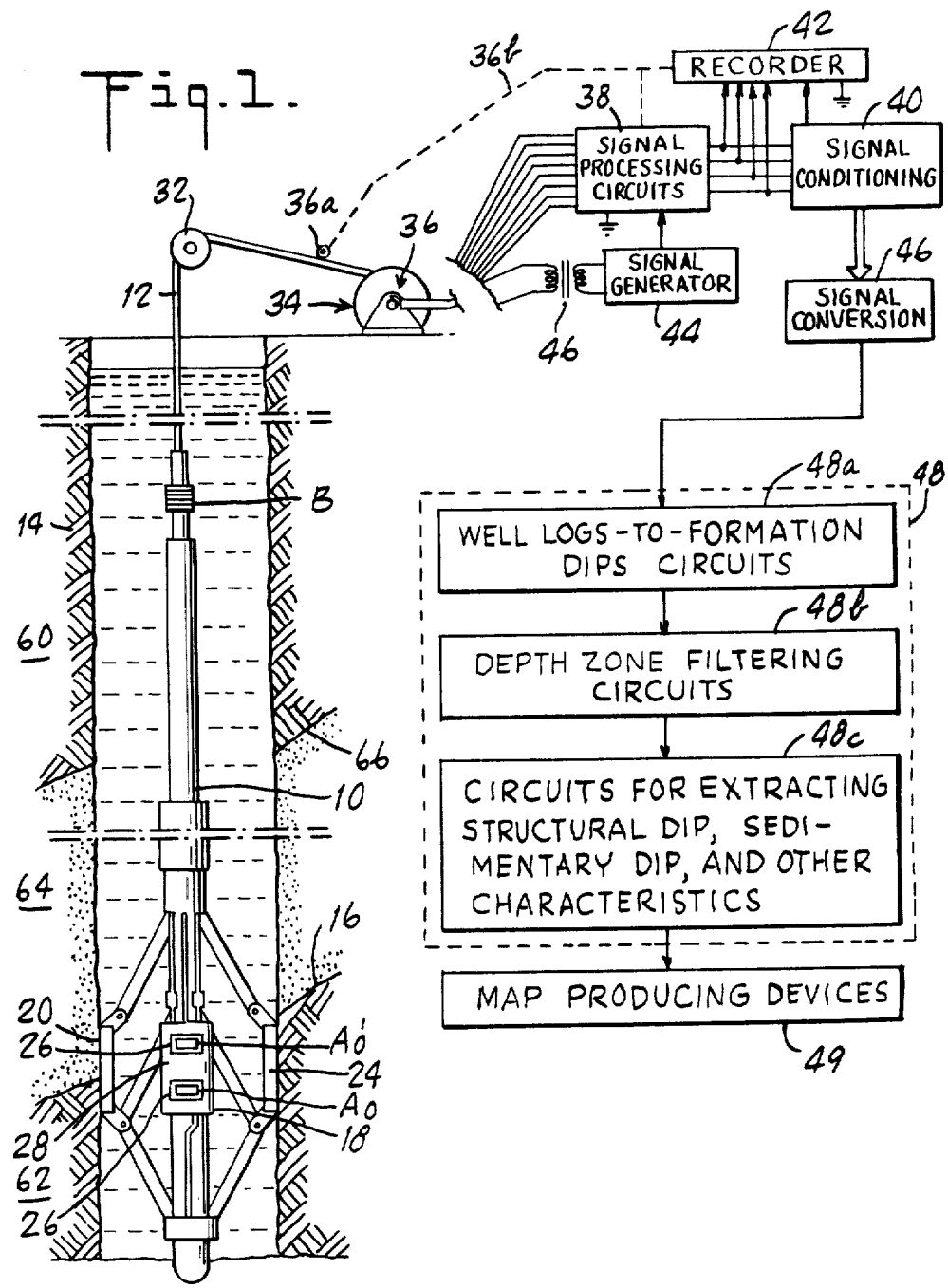
FIG. 1 is an overall illustration of a well logging system making use of the invention.

Referring to FIG. 1 for an overall illustration of a well logging system making use of the invention, a multipad investigating tool 10, commonly referred to as a dipmeter, is lowered on an armored multiconductor cable 12 into a borehole 14 to investigate a subsurface earth formation 16. The tool 10 is adapted for movement up and down the borehole 14 and may include four pads 18, 20, 22 and 24 (the front pad 18 obscures the view of the back pad 22 which is not shown). The pads 18, 20, 22 and 24 are uniformly angularly spaced from each other along the circumference of the borehole 14. Each pad carries one or two (or more) measuring devices each adapted to derive well logging measurements, comprising sets of samples, or logs, at the wall of the borehole 14. The pads 18, 20, 22 and 24 may each carry, for example, a survey electrode designated $A_o$, and one of the pads, for example, in this instance pad 18, may carry an additional survey electrode $A'_o$, useful in determining the speed of the tool 10. Each survey electrode $A_o$ is surrounded by an insulating material 26. The insulating material 26 and the survey electrode $A_o$ are further surrounded by a main metal portion 28 of the pad. The metal portion 28 of each pad, along with certain other parts of the tool, may comprise a focusing system for confining the survey current emitted from each of the different survey electrodes into the desired focus pattern. Survey signals representative of changes in the earth formation characteristics along a path in the borehole opposite the path inscribed by the movement of the respective electrode are produced from circuits comprising the $A_o$ electrodes, focusing elements, and current return electrode B. In addition, the tool may contain devices (such as magnetic compass and a device for detecting the tool inclination from the vertical, which devices are not shown) to provide signals from which the attitude of the tool itself can be found each time the devices on its pads take log samples. A detailed description of the multipad (and therefore multipath) investigating tool is disclosed in U.S. Pat. No. 3,521,154 issued to J. J. Maricelli on July 21, 1970 and entitled, "Methods and Apparatus for Enhancing Well Logging Signals by the Use of Multiple Measurements of the Same Formation Characteristic".

The upper end of the multipad investigating tool 10, as shown in FIG. 1, is connected by means of the armored multiconductor cable 12 to suitable apparatus at the surface of the borehole 14 for raising and lowering the tool 10 therethrough. Mechanical and electrical control of the tool 10 may be accomplished with the cable 12 which passes from the tool 10, up through the borehole 14 to a sheave wheel 32 at the surface and then to a suitable drum and winch mechanism 34.

Electrical connections between various conductors of the cable 12, which are connected to the previously described electrodes, and various electrical circuits at the surface of the earth are accomplished by means of a suitable multi-element slip ring and brush contact assembly 36. In this manner the signals which originate from the tool 10 are supplied to signal processing circuits 38, which in turn supply the signals to a signal conditioner 40 and a recorder 42. A suitable signal generator 44 supplies current to the tool 10 via a transformer 46 and, as may be needed, to the various signal processing circuits at the surface. Further details of such circuits are described in the aforementioned Maricelli patent.

The log signals from the investigating tool 10 may be recorded graphically by a film recorder 42. One such recorder is disclosed in U.S. Pat. No. 3,453,530 issued to G. E. Attali on July 1, 1969, and entitled, "Methods and Apparatus for Investigating Earth Formation Including Measuring the Resistivity of Radically Different Formation Zones". In addition, the log signals may be processed to obtain discrete samples and recorded on digital tape. A suitable digital tape recorder is described in U.S. Pat. No. 3,648,278 issued to G. K. Miller et al on Mar. 7, 1972, and entitled, "Methods and Apparatus for Use in Processing Well Logging Data".

The signals derived from each electrode of the tool 10 may be sampled by driving sampling devices, such as those in the digital tape recorder, by sampling signals based on the motion of the cable 12 as measured at the surface. For example, a cable length measuring wheel 36a shown in FIG. 1 may be used in timing of the signal processing circuits 38 and the sampling and recording cycling as indicated by a sampling signal line 36b. Each log sample thus corresponds to a measurement taken at a given depth in the borehole, and this depth can be found, e.g., by knowing the depth of a given log sample, the depth interval between samples and the order of the sample of interest in the set of samples which make up the log.

The log samples may be transmitted directly or indirectly to computer circuits which may be located at the well site or may be transmitted via a transmission system to computer circuits at a remote location. One transmission system which may be used is disclosed in U.S. Pat. No. 3,599,156 issued to G. K. Miller, et al., on Aug. 10, 1971, entitled, "Methods and Apparatus for Transmitting Data Between Remote Locations".

The recorded or transmitted log samples (and any other tool output) may be processed as digital signals by a suitably configured digital computer conditioned, as by programming, to carry out the process described herein, or by a special purpose computer apparatus composed of circuits and/or modules built and arranged especially for the purpose of carrying out the described steps of the same process.

Alternatively, as shown in FIG. 1, the signals may be processed directly at the well site, using digital apparatus 48 (described in detail below) interfaced with signal conditioner 40 through a signal conversion means 46. One example of such apparatus is the system PDP-10 made by Digital Equipment Corp and specially modified, as by stored instructions, to carry out the necessary steps of the process. Suppliers of such equipment may also supply conditioning circuits 40 and signal conversion means 46 suitable for conditioning and converting analog signals to digital samples for subsequent digital storage and processing. Further, the computing apparatus includes memory circuits for storing log samples (and any other relevant tool output) and intermediate and final results of signal processing, as well as signals related to various parameters, coefficients and controls used and generated in the processing steps.

As the tool 10 goes through the well 14 it passes through different subsurface earth formations. Typical formations are represented, for example, by earth formations 60 and 62 shown in FIG. 1, and intervening sand formation 64. Typical earth formation features are boundaries 16 and 66 shown between these formations.

Thus, in review, for each path measured by the tool 10 there is produced a set of samples, each sample being a measure of an earth formation characteristic at a given depth and for a given path in the well 14. A set of such samples for a given path constitutes one log. Four logs are obtained from the particular investigating tool 10, illustrated here.

Figure 2:
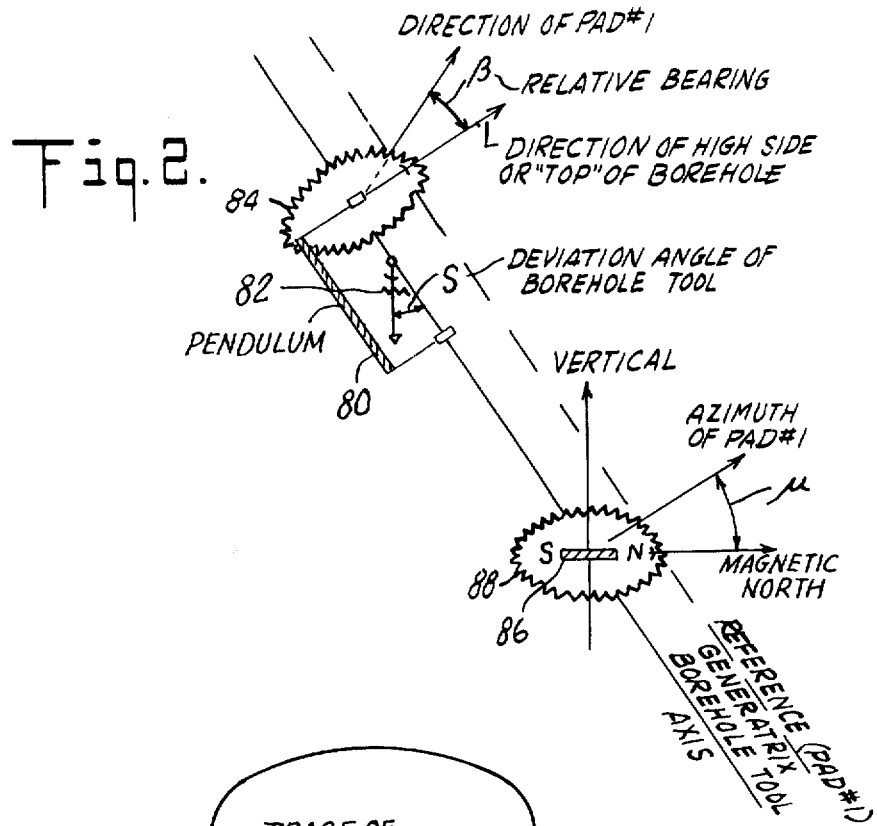
FIG. 2 illustrates a part of a dipmeter tool shown in FIG. 1.

Referring now to FIG 2, a brief description will be given of how certain reference information is produced for the purpose of characterizing the position of the multipath investigating tool 10, and consequently the sources of the signals. Incorporated within the tool 10 shown in FIG. 1 is an inclinometer system, schematically illustrated in FIG. 2. The inclinometer system is referenced to one of the signal sources, usually on the pad designated as number 1, in this case, pad 18. The inclinometer system is composed of two related measuring systems. One system contains a pendulum 80 suspended in relation to the centerline or axis of the tool 10 such that it establishes a vertical plane in which to measure the deviation angle $\Delta$ of the tool 10. This may be accomplished, for example by measuring, with a second pendulum and a potentiometer 82, the angular deviation of the tool axis from the vertical pendulum. This deviation is sometimes referred to as the drift angle. The first pendulum 80 is also related in a rotational sense to the position of the reference pad. An additional potentiometer 84 may be used to measure the rotational angle $\beta$ between the reference pad and pendulum 80 position. This angle is conventionally measured from the high side or the top of the borehole and is commonly referred to as the relative bearing. It is conventional to measure this angle such that it has a positive sign when measured clockwise from the high side of the hole to pad 1.

An additional system incorporated within the tool 10 includes a magnetic compass 86 and another potentiometer 88 such that the potentiometer measurement reflects the angle by which the referenced pad differs from magnetic North as measured by the compass 86. As further shown in FIG. 2, this angle $\mu$ corresponds to the azimuth of the number 1 pad. Thus, it may be seen how the position of a reference point on the tool 10, i.e., pad 18, may be related both to magnetic North, as expressed by the azimuth, and to the top of the hole as expressed by its relative bearing and deviation angle.

It should be apparent that any measurement which is referenced to the position of the pad 18, may also be referenced to the top of the borehole 14 or magnetic North which, of course, may be converted to geographic North. Still further, it will be apparent how the position of the top of the borehole and magnetic North may be referenced to pad 18. It is well known how to use these reference measurements. Further details may be obtained, for example, in a paper, "Automatic Computation of Dipmeter Logs Digitally Recorded on Magnetic Tape" by J. H. Moran et al, in the *Journal of Petroleum Technology*, July, 1962, particularly in the appendix thereof.

Figure 3:
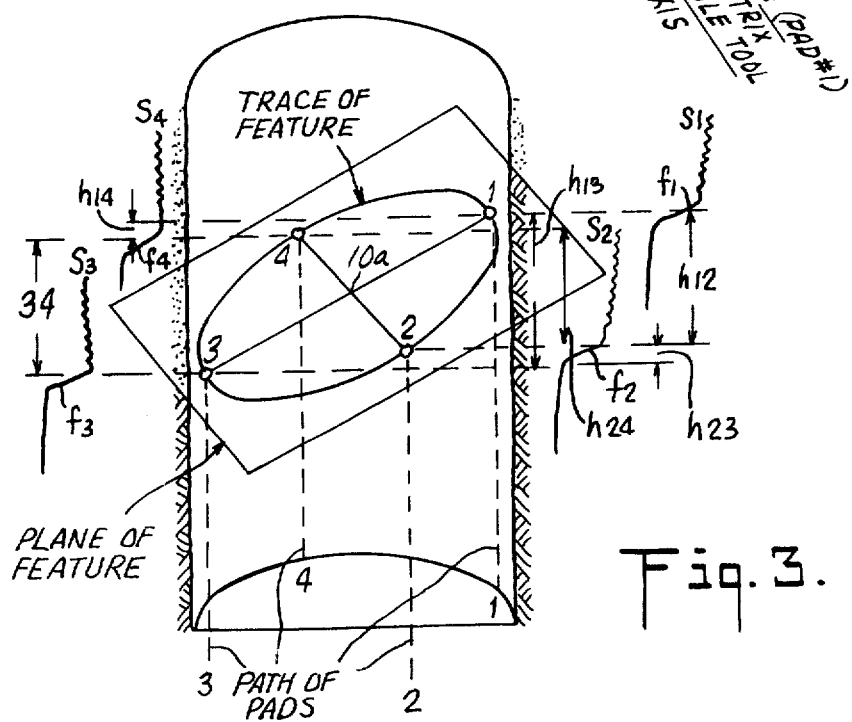
FIG. 3 illustrates the dip of a formation feature intersecting a borehole.

Referring now to FIG. 3, there are illustrated the four pads 18, 20, 22 and 24 of the dipmeter 10 shown in FIG. 1. The pads 18, 20, 22 and 24 are designated here as pads 1, 2, 3 and 4. As the dipmeter 10 goes through the well 14, log measuring devices $A_o$, one on each pad, trace respective paths along the wall of the borehole as indicated by the dash vertical lines in FIG. 3. These paths intersect an earth formation characteristic, indicative of a bedding surface, at the borehole wall at the four points indicated by small circles, 1 through 4. The nature of the pad suspension system for the dipmeter assures that these paths are on opposite sides of the borehole well for four alternate, circumferencially spaced pads, i.e., pads 1 and 3 and pads 2 and 4 are on opposite sides of the borehole 14 relative to the tool axis, which is at 10a.

The log signal response for the four paths, one per pad, is shown in FIG. 3 as S1 through S4. The change in the character of the log signals, corresponding to the earth formation characteristic relative to the planar feature which intersects the borehole 14, is shown as signal features $f_1$ through $f_4$. When the plane of the feature is so inclined relative to the borehole 14, there will be a difference in depth (in the borehole) between the corresponding features of each log signal. As shown in FIG. 3, one path will respond to the feature first, with the opposite path responding last as the tool 10 traverses the borehole. Specifically in this instance, these paths correspond to pads 3 and 1 respectively.

It is known that the difference in borehole depth between the points of intersection of the feature with the path of the logs along the wall of the borehole 14 may be determined by use of a process which measures the similarity of two signals. For example, the degree of similarity between log samples S1 and S2 can furnish the depth difference $h_{12}$, between points $f_1$ and $f_2$. As illustrated in FIG. 3, path 2 intersects the feature plane at a greater depth than path 1. Thus, the depth of point $f_1$ on signal S1 is less than the depth of point $f_2$ on signal S2. By convention, the depth difference $h_{12}$, between the points of intersection in S1 and S2, is therefore, considered to be negative. This is consistent with the notation that the depth difference between two signal features equals the depth of the feature on the signal from the first path minus the depth of the feature on the signal from the second path.

Additional depth differences along the borehole 14, similar to the differences determined between points $f_1$ and $f_2$ corresponding to the adjacent paths 1 and 2, may be found for the four-arm tool 10 by comparing the respective degrees of similarity of adjacent signals S2 with S3, S3 with S4 and S4 with S1. Two additional depth differences may be obtained to complete a full round of depth displacements in the illustrated case by correlating log signals S1 with S3 and S2 with S4, obtained from the diagonally opposing paths. Thus it can be seen that the difference in depth in the borehole 14 between the points of intersection of the feature with the paths of the logs taken along the borehole 14 may be determined by use of a process which measures the similarity of pairs of log signals.

It is also known that the positions of any three points define the position of a plane, and that the position of a planar feature may be expressed in the dipmeter art as the depth, dip and azimuth of the plane. Referring to FIG. 4, the plane of the feature described in FIG. 3 is duplicated as a circle on a unit sphere with its center at 0. This circle is identified by a vector 0P perpendicular to the plane of the feature. If the sphere is considered to be of unit radius, vector 0P is called the unit dip vector. The line connecting the log measuring devices of pads 1 and 3 is the x-axis of a coordinate system having its origin at 0, the line connecting the log measuring devices at pads 2 and 4 is the y-axis, and the axis of tool 10 is the z-axis. The angular distance from point U on the upper half of the unit sphere at the 0z-axis to point P is the apparent dip magnitude, $\theta'$, and the angular distance counted clockwise, from the meridian plane containing coordinate axis 0z and 0x, to the meridian plane containing axis 0z and vector 0P, is the apparent dip azimuth, $\phi'$. Thus, the location of point P fully defines the orientation of the illustrated bedding surface. Note that the vectors are projected relative to the position of the pads in the electrode plane (i.e., the plane of devices $A_o$) of the tool 10. The diagonal 1-3 forms the x-axis and the diagonal 2-4 forms the y-axis, thus defining an equatorial electrode plane. The axis of the tool 10 forms the z-axis. Point P could be referred to in geographic coordinates, as already described, by locating on the sphere its intercepts with the true vertical axis and the North vector. When expressed in terms of the relationship of the unit vector with respect to the horizontal plane and true rather than magnetic North (by using known geometrical and geographic relationships), the resulting true dip magnitude may be designated $\theta$ and the true dip azimuth-$\phi$. The depth in the borehole of the point 0 at the origin of the unit vector may be designated Z. Thus, the "dip" at a given depth in the borehole may be characterized by the set Z, $\theta$, $\phi$. This may be called "formation dip" at depth Z, understanding that in general it is an estimate which is hoped to be close to the actual dip of the earth formation (which cannot typically be measured directly), and understanding that there may or may not be, at the depth Z, an actual interface between two earth formation layers or structures which have significantly different logged properties.

If both $\theta$ and $\phi$ of an earth formation feature are equal to zero, i.e., the earth formation feature is at the electrode plane of the tool 10, the point representing the corresponding dip falls at the zenith of the unit hemisphere in FIG. 4, i.e., point U. A point P corresponding to an earth formation feature which is nearly parallel to the tool axis falls near the unit sphere's equator, corresponding to an apparent dip magnitude which approaches 90°.

The various apparent "dips" at various depths in the borehole, as defined by various $\theta'$ and $\phi'$ pairs, may be plotted as points on the upper hemisphere of the sphere in FIG. 4. These points usually do not fall at the same place on the sphere—if they do, the measured attitudes of the earth formation features are in perfect coherence.

Figure 5:
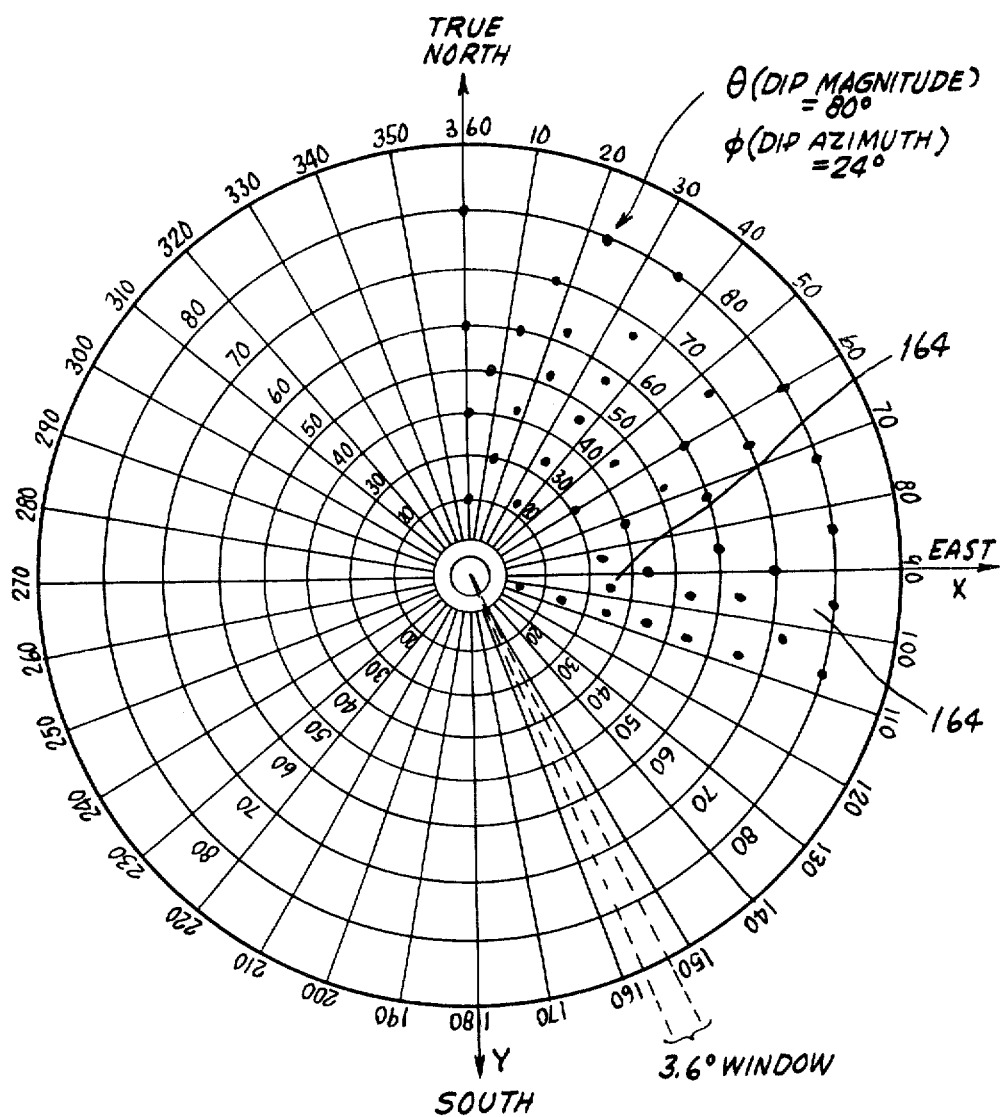
FIG. 5 illustrates an equal area Schmidt plot of formation dips.

While the dips can be plotted on the surface of the upper hemisphere of the sphere of FIG. 4, for convenience it is more practical to represent the hemispherical surface (either it is in terms of apparent dip magnitudes and azimuths or when it is in terms of true rather than apparent dip magnitudes and azimuths) by an equivalent planar map, sometimes referred to as the "Schmidt Equal Area Map", illustrated in FIG. 5 in terms of true dip magnitudes and azimuths. The numbered concentric circles in FIG. 5 represent coordinates of dip magnitude $\theta$, and the numbered radii represent coordinates of dip azimuth $\theta$. The plane of the paper represents the horizontal plane. In the map of FIG. 5 the hemisphere has been projected onto a circular area but in such a way that any one of the map cells 164 represents the same surface area of the hemisphere even though these cells have different sizes in the map of FIG. 5. A formation dip which corresponds to a horizontal plane crossing the borehole will appear as a point at the center of the map in FIG. 5. A vertical formation feature extending from true North to true South will appear as a point which is on the radius pointing to the right and is on the outermost circle of the map. Of course the map does not indicate the borehole depth at which the formation dips occur; it only indicates what the dip magnitude and dip azimuth of a dip are. Formation dips which occur at different depths in the borehole but have dip magnitudes and dip azimuths which are within a small range will appear as a cluster of points within one or a few of the equal area cells illustrated in FIG. 5. Indeed, if the map of FIG. 5 is constructed for a given limited depth interval in a borehole the clustering of the points representing dips may give some indication of what the prevalent dip or dips are. Of course it is also possible, if found convenient, to convert the cells of the map in FIG. 5 to a rectangular array of cells by changing their relative shape and arrangement but preserving their contents, i.e. preserving the number of points within a cell. It is also possible to subdivide the hemisphere into another arbitrary number of equal area cells, for example into 51×51 or 45×45 equal area cells and to construct an equal area planar Schmidt map of the type shown in FIG. 5 which has only, say 51×51 or 45×45 cells, as discussed for example in the Clavier et al patent application cited above. One purpose of this may be to facilitate adapting existing plotting or printing instruments to use in connection with this invention. Indeed, in a specific example of this invention the equal area map which is used is made up of 45×45 cells, although coarser maps are used in some steps, as discussed in detail below.

In the illustration of FIG. 1 the conditioned and suitably formatted well logging signals from signal conversion circuit 46 are first supplied to well logs-to-formation dips circuits 48a, to be converted there to formation dips. As mentioned above a formation dip is the dip, expressed for example in terms of true dip magnitude and true dip azimuth, of a formation feature at a given depth in the well and may be represented by the signals designated Z, $\theta$, $\phi$. One particular example of a way to derive the formation dips which can be used in conjunction with this invention is discussed in the above-identified Clavier et al patent application. To simplify the description of this invention, it will be assumed that Step 48a is performed by apparatus and processes as discussed in said Clavier et al application and that it provides as its output a sequence of formation dips each identified by its characteristic depth in the borehole, true dip magnitude and true dip azimuth. In addition, it will be assumed for simplicity that each formation dip is further identified by where it is located in an equal area Schmidt map having 45×45 cells. For example, each formation dip provided by circuits 48a may be characterized in addition by a signal which identifies to which equal area cell in a 45×45 map it belongs. As discussed in the above-identified Clavier et al application these formation dips are at a succession of depth levels in a borehole and are derived from the well log outputs of measuring devices carried on a dipmeter tool passed through the borehole, as for example the measuring devices discussed in connection with the dipmeter tool 10.

The output of circuits 48a is supplied to depth zone filtering circuits 48b the purpose of which is to filter the formation dips into depth zones made up of dips which are mutually consistent within a zone, of course within selected criteria for what may be considered consistent. A depth zone in this context may be thought of as a depth interval in the borehole starting at some top depth level and going down to some bottom depth level, characterized by containing only earth formations which have mutually consistent dips. Some exemplary criteria for what may be considered mutually consistent dips are discussed in greater detail below; some examples are the requirements that: it must contain a minimum number of formation dips which are the same within a small tolerance, there must be no more than some small randomness of the dips included in it, and the dips in it which are the same within the small tolerance must not be separated from each other by more than a maximum number of other dips. One of the main purposes of filtering the formation dips into depth zones is to find zones of formations which are likely to share the same structural dip within a structure made up of a number of sedimentary layers and to then find and map, characteristics of the zones which are considered most useful in the search for and exploitation of resources such as oil and gas. Of course the filtering of the formation dips into depth zones also defines where there are gaps between adjacent zones, and an important aspect of the invented system is concerned with treating and mapping such gaps.

As illustrated in FIG. 1, the output of Depth Zone Filtering Circuits 48b is supplied to circuits 48c for extracting certain characteristics of the zone-filtered logs, and the output of circuits 48c is supplied to map producing devices 49 to produce the desired maps discussed in detail below.

Figure 6:
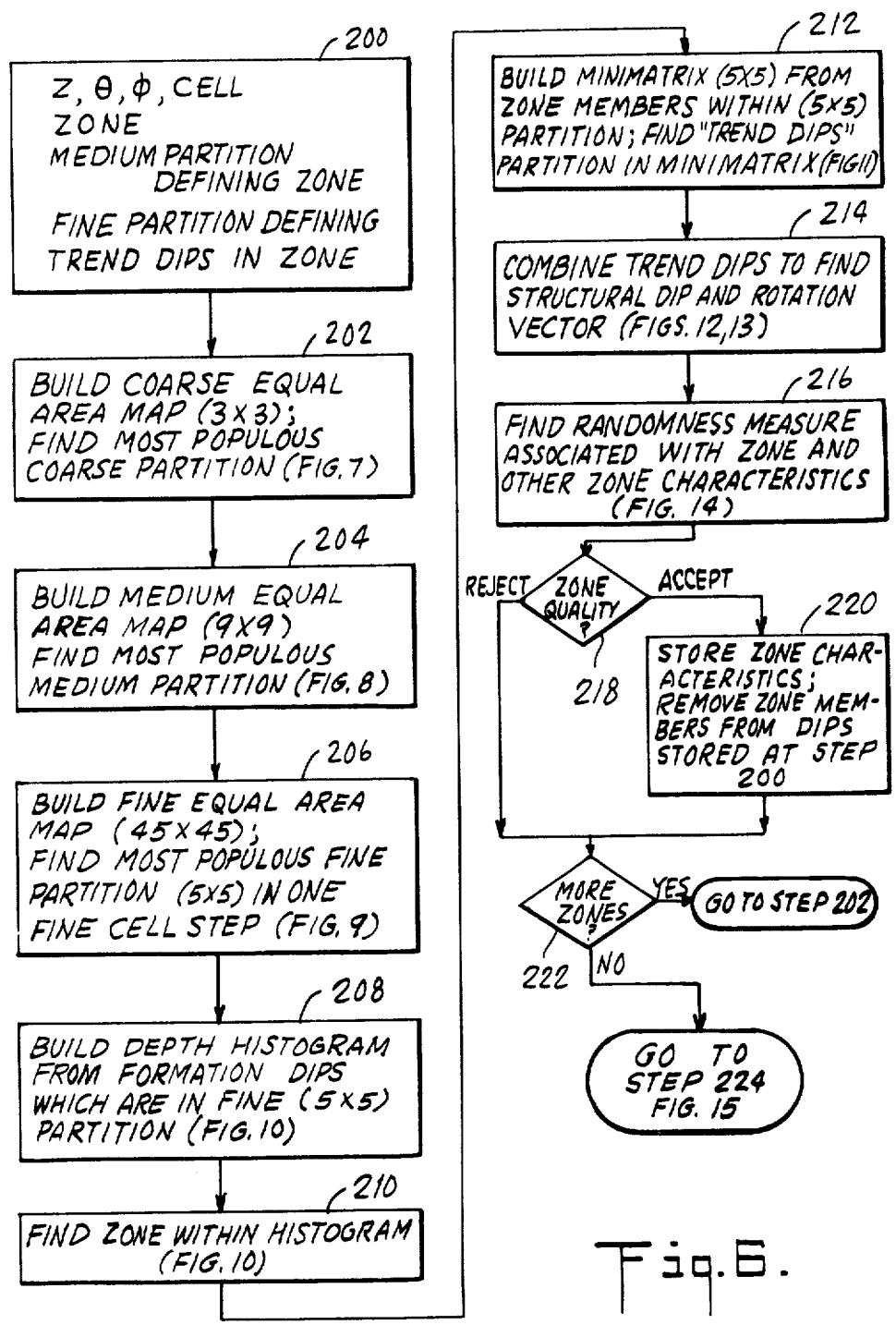
FIG. 6 is a flow chart illustrating some of the major steps in the operation of a system embodying the invention.

Referring to FIG. 6 for a generalized flow chart explaining some major steps of the process carried out by the depth zone filtering circuits 48b of FIG. 1, the process carried out by the invented system may start at Step 200 with definitions of the formation dips provided by the formation dip circuits 48a of FIG. 1. These signals, as indicated at Step 200, comprise for each formation dip, the signals Z, $\theta$, $\phi$, and may additionally comprise a signal identifying the cell of a, say, 45×45 equal area map to which the formation dip belongs. Associated with each formation dip may be empty memory locations for future storage of signals labelled, at Step 200, Zone, Medium Partition Defining Zone and Fine Partition Defining Trend Dips In Zone. The significance of these further characteristics will become apparent in the discussion of FIG. 6 below. If, as it is common with systems such as described in the Clavier et al application identified above, there are some 50 or more formation dips found per hundred feet of borehole depth, and if the borehole of interest is several thousand feet deep, there may be several thousand formation dips identified by signals stored in a suitable memory at Step 200 and each associated with some empty memory locations for the additional signals to be associated with them.

At Step 202 the formation dips are organized by building a coarse equal area map, for example a map having only 3×3 coarse cells, where each cell contains only those formation dips having dip magnitude and dip azimuth within the range of the coarse cell. Referring to FIG. 7 for an example, the equal area Schmidt map illustrated in FIG. 5 may be superimposed on a square map which just subtends it and is made of 3×3 cells. The outer limit of the Schmidt equal area map is represented in FIG. 7 as the circle 202a. Any formation dips which are within the area of the Schmidt map that coincides with the 2, 2 cell of the coarse map are considered to be members of that 2, 2 coarse cell. Similarly, any formation dips which are within the shaded area in FIG. 7 of the Schmidt map are considered to be members of the 3, 3 coarse cell of the 3×3 map. It can be observed that while all of the 2, 2 cell in FIG. 7 coincides with the Schmidt map this is not true for any other cell. This, however, does not detract from the operation of the invented system. In the same Step 202 the coarse equal area map is panned, i.e. searched, for the most populous cell, that is the cell containing the greatest number of formation dips. It is panned in steps of one of the cells. To visualize this conceptually, a window is placed over the 2, 2 cell and the population of that cell is counted. The window is then moved left one cell to the 1, 2 cell, the population of the 1, 2 cell is counted and compared with that of the 2, 2 cell. The window is then moved up one cell and so on until the most populous course partition is found. For the purposes of an illustration, let us assume that this is the partition which coincides with the 2, 2 coarse cell.

The formation dips discussed in connection with Step 200 are then further divided in Step 204 by building a medium equal area map, say a 9×9 map similar to the one discussed in connection with FIG. 202. Referring to FIG. 8 for an illustration the same equal area Schmidt plot, this time labelled 204a, is inscribed within a square 9×9 medium equal area map. As in the case of FIG. 7, those formation dips which are within the part of the Schmidt map coinciding with one of the medium cells in FIG. 8 are considered to be members of that cell. A 3×3 window of medium cells, illustrated at 204e in FIG. 8, is panned through the FIG. 8 map in steps of one medium cell. For example, the window 204b is moved one cell of the 9×9 map to the left, then one cell of the 9×9 map up, etc., until the window is in the position in which it encloses the greatest number of formation dips. It is noted that the panning process starts when the window 204b in FIG. 8 corresponds in position to the cell in the map of FIG. 7 found to be the most populous coarse partition at Step 202. Let us assume for the purpose of this example that the most populous medium partition is at the position 204c shown in FIG. 8.

At Step 206 a fine equal area map, say a 45×45 map, is built up. Referring to FIG. 9 for an illustration, the fine map similarly inscribes the Schmidt equal area map, which in this case is designated 206a. As in the case of FIGS. 7 and 8, the dips which are within that area of the Schmidt map which coincides with one of the 45×45 fine cells are considered to be members of that fine cell. This fine map is panned with a 5×5 window which is initially centered at the center of the most populous partition found in FIG. 8. The initial position of this 5×5 window is illustrated at 206b in FIG. 9. After panning it through FIG. 9 in steps of one of the fine cells of FIG. 9, its position in which it partitions the most populous 5×5 area of FIG. 9 is illustrated at 206c. This fine partition 206c now encloses those formation dips whose dip magnitudes and dip azimuths are close to each other and are all within the dip magnitude and dip azimuth ranges defined by that window 206c. One of the recognitions on which the invention is based is that it is likely that at least some of the formation dips within the window 206c belong to a zone of the kind discussed earlier.

Figure 10:
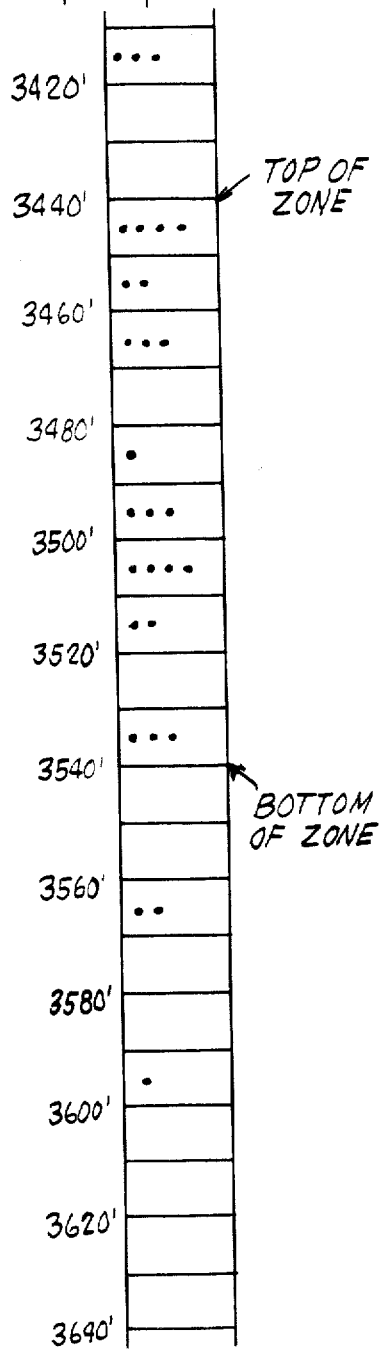
FIG. 10 illustrates a histogram related to step 208 in FIG. 6.

In order to find if indeed there is a zone made up of formation dips within the window 206c, the invented system proceeds to Step 208. To visualize the histogram built up in Step 208, reference is made to FIG. 10 illustrating a portion of such a histogram. It may be thought of as a sequence of depth cells where each cell corresponds to a small depth interval of the borehole, for example, 10 feet. The partition into depth cells is arbitrary but it is recognized that it is convenient to have the partition such that a maximum number of members of any one cell of the depth histogram would be five or ten. In the example of FIG. 10, the depth interval of a cell of the histogram is 10 feet, which in this example is selected because circuits 48a of FIG. 1 output at most ten formation dips for ten feet of borehole depth (i.e., at most one formation dip per foot of borehole). The numbers in the lefthand column of FIG. 10 represent the depth in the borehole at which one depth cell ends and another begins. Thus, the topmost depth cell of the histogram is for the borehole interval from 3410 to 3420 feet of depth. In Step 208 the invented system goes to each formation dip which is within the fine partition 206c in FIG. 9 and assigns it to the depth histogram cell to which it belongs by virtue of its depth. Thus, if a formation dip identified by the characteristics $Z$, $\theta$, $\phi$ is identified by a point within the partition 206c in FIG. 9 and its depth $Z$ is, say, 3402 feet it would be assigned to the topmost depth cell illustrated in FIG. 10. The fact that a formation dip has been assigned to a cell in FIG. 10 is conceptually illustrated by a dot in the cell. Thus, the topmost cell in FIG. 10 has three dots indicating that three formation dips have been assigned to it. These three formation dips have the following common characteristics: each is for a depth between 3410 and 3420 feet in the borehole and each has dip magnitude and dip azimuth which have placed it within the window 206c in FIG. 9. The same process is carried out for all of the formation dips within the window 206c. When this is done the depth cells of the histogram may have contents as illustrated in FIG. 10, i.e. some may be empty and some may have one or more formation dips assigned to them.

Once the histogram of the formation dips within the partition 206c is built up as illustrated in FIG. 10, the system proceeds to Step 210 to find, if possible, a zone within the histogram. To do this the system looks for a nearly continuous sequence of occupied depth cells in the histogram. The term nearly continuous may mean in this context a string of occupied cells where any two occupied cells are separated from each other by no more than one empty cell. Two or more adjacent empty cells cannot be within a string that can be called a zone. One such string is illustrated in FIG. 10 and is between the depths marked Top of Zone and Bottom of Zone. There may be two or more such strings in a historgram. The longest one is selected as the zone. At most one is selected per histogram.

Figure 11:
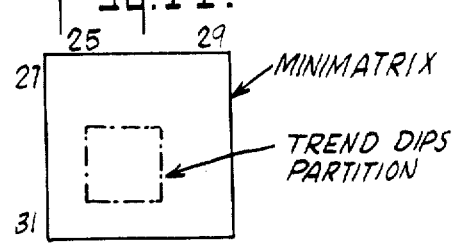
FIG. 11 illustrates a minimatrix of dip values in connection with the operation of step 212.
Figure 12:
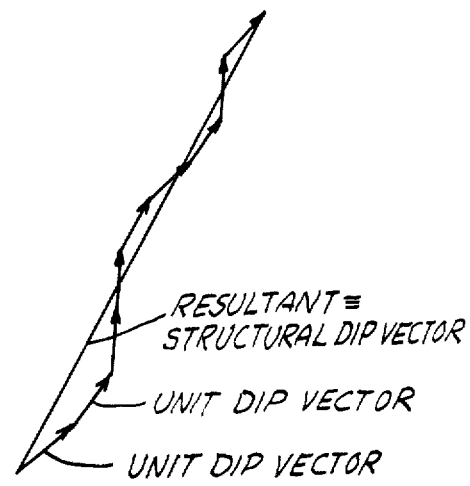
FIG. 12 illustrates the combination of unit dip vectors in connection with step 214 of FIG. 6.

Once the zone is identified and the formation dips assigned to the depth cells making up the zone in the histogram are known, a mini matrix is built up from those zone members. The mini matrix, illustrated in FIG. 11, is in the same cell partition as the fine equal area map (the 45×45 map discussed earlier) and it coincides with the partition 206c in FIG. 9. However, while the partition 206c in FIG. 9 contains all formation dips whose dip magnitudes and dip azimuths place them in that window the mini matrix of FIG. 11 contains only those of the formation dips in the partition 206c which additionally happen to have depth levels that place them within the zone found in Step 210. A 2×2 window is then panned through the mini matrix of FIG. 11, in one fine cell steps, to find the position of that window in which it contains the greatest number of dips, i.e. to find the most populous 2×2 partition of the mini matrix. Such a partition is called a trend dips partition and is so labelled in FIG. 11. The significance of this partition is that it is likely to contain the formation dips which are most indicative of the structural dip of the zone. Stated in physical terms, the mini matrix of FIG. 11 contains formation dips which are likely to belong to sedimentary layers which share a common structural dip, and the trend dips partition is likely to contain the formation dips which belong to sedimentary layers having dips most representative of that common structural dip. The significance of combining these trend dips in accordance with the invention so as to find the likely structural dip, can be visualized by considering the trend dips as unit vectors and the structural dip as the vector sum of these unit vectors. Referring to FIG. 12 for an illustration, the unit vectors representing the trend dips found in Step 212 are illustrated as the shorter arrows and the resultant vector sum of these vectors is an illustration of the structural dip. The probable error on the trend dip magnitude is the dispersion figure, which is equal to the arc cosine of the ratio of the length of the resultant structural dip vector to the number of unit vector from which it results. The probable error of the structural dip azimuth is a function of both the dispersion measure and the dip magnitude of the structural dip. In the same Step 214 in which the structural dip is found in terms of its dip magnitude and dip azimuth, a rotation vector or matrix may be found which is simply a representation of the structural dip in a way which makes it convenient for use in eliminating structural dip from the formation dips so as to leave sedimentary dip. One example of a rotation vector is structural dip in terms of its three Cartesian coordinates.

The invention makes use of the recognition that the vast majority of the formation dips measured by the current high resolution dipmeter tools result from sedimentation processes as opposed to other planar events such as fractures, and that sedimentary layers are seldom highly inclined with respect to the horizontal plane at the time of their deposition. Most sedimentary dips are of lower magnitude and the higher the magnitude the more exceptional their occurrence. Therefore, the density of probability of occurrence of dips is greatest at horizontal at the time of deposition. This becomes, of course, the structural dip after formations have been submitted to rotations by tectonic forces. As a corollary of this the formation dips measured by high density dipmeter tools are likely to appear as clusters of points in the equal area Schmidt map about the value of the structural dip. In this context a cluster is a group of dip points in the equal area map characterized by an abundance of small mutual angular distances along the map and by the relative scarcity of high angular distances among any two of them.

Referring to FIG. 13 for a highly simplified illustration, the vertical line represents a borehole which intersects a number of formation features, which in this case can be thought of as the interfaces between sedimentary layers of different characteristics. The sedimentary layers in the top group are approximately horizontal where they intersect the borehole and are typical of sedimentary layers at the time of their deposition. Their sedimentary dip is about equal to their structural dip and would be represented by a point at about the center of an equal area Schmidt map. If the entire group of sedimentary layers is rotated by some tectonic movement it may look like the second illustration from the top in FIG. 13, that is, all of the layers are now inclined with respect to the horizontal but are still approximately parallel to each other. Each of the rotated layers has a dip different from its dip before the tectonic movements but the rotated dips of the several layers are about equal. It is likely that the individual formation dips of the sedimentary layers of the second group will show up as a cluster of points at some off-center area of the equal area Schmidt map. The location of this cluster in the equal area Schmidt plot is likely to be indicative of the structural dip shared by all of the sedimentary layers of the second group. The purpose of the operation of the process discussed above in connection with Steps 200 through 210 is to find just such a group of sedimentary layers and to classify it as a zone. The purpose of the next two steps, i.e., Steps 212 and 214, is then to find the dip shared by these rotated sedimentary layers, which in fact likely to be the structural dip of the formation comprised of those layers. If indeed the structural dip can be found for the second group of sedimentary layers, when this structural dip is subtracted (in vector terms) from the individual dips of the sedimentary layers the effect is that of rotating the sedimentary layers measured after the tectonic movement to their positions before the tectonic movement. After such rotation the invented system can successfully search the underground formations for particularly important sedimentary patterns such as the "red pattern" or the "blue pattern" illustrated in FIG. 13, which may not be discernible before rotation of sedimentary patterns by eliminating the effect of the structural dip on their individual dips.

Returning to FIG. 6, it is noted that in Step 212 formation dips which are consecutive in borehole depth and occupy the same cell of the fine partition built up in Step 206 are used as one single occurrence and one single entry into the mini matrix of Step 212. This is for the purpose of eliminating from the structural dip determination such recurring formation dips which are associated with sedimentary structures and may mislead the search for the true structural dip which is thought to appear as more scattered occurrences along the population of dips in the zone. In the event that one long sequence of equal dips should occur it would not be formed into a zone because it would appear as containing only one formation dip and would be rejected. It may then be treated as an eigenvector gap, as discussed later in this disclosure, and would appear with a very low measure of dispersion. Still considering Step 212, one reason why the mini matrix is panned with a 2×2 window rather than a single cell window is to neutralize the possibility of changes in the resulting structural dip from fortuitous changes in the relative position of the actual cluster of the formation dips with respect to the panning window. This feature may be thought of as a deliberate blurring effect.

The structural dip resulting from Step 214 is not necessarily equal to the formation dip of any one of the trend dips identified in Step 212. However, all of those trend dips will have values within a close range of the structural dip by virtue of the small size of the trend dips partition.

The trend dips found in Step 212 are expected to be represented throughout the depth interval defined by the top and bottom of the zone. Each depth fraction of the zone is expected to contain a few representatives of the trend dips, i.e., a few of the members of the trend dips partition discussed in connection with Step 212. If all of those members of the trend dips partition happen to be grouped in the same depth fraction of the zone, leaving the larger fraction free of occurrence of trend dips, those participants should not be considered representative of the zone.

This recognition is used in the invented system by finding a randomness measure associated with the structural dip found in Step 214. Thus in Step 216 a randomness measure is found by measuring the average distance between the depths in the borehole of pairs of trend dips chosen on either side of their median depth and comparing it to half the length of the zone itself. Referring to FIG. 14 for an example, there is a zone A having a certain length and a certain number of trend dips identified by points. The distance between the two points related by the bracket 216 is found and the same is done for all other pairs of such points, for example a pair identified by the bracket 216b. The ratio of the average of those distances and half the length of the zone A would be close to one in this case, which would be close to a perfect randomness. As another extreme there is a zone B which contains a trend dip close to each extreme and a very dense cluster of trend dips near the center of the zone. The average distance between the points two pairs of which are identified by the brackets 216d and 216e will clearly be much less than half the length of the zone. In this case the randomness measure will be a small fraction of unity. Once a structural dip and its associated randomness measure have been found in steps 214 and 216, the system considers the available results at step 218 to determine if the zone is of acceptable quality. For example, a test may be made at step 218 to determine if the randomness measure found in step 216 exceeds a selected level, say, 0.1. Another test may be whether the zone contains enough formation dips which have been qualified as trend dips by virtue of being within the trend dips partition found at steps 212, for example, to determine if it contains more than five trend dips. Another test may be whether the zone is sufficiently long, i.e., whether it consists of more than one dip cell of the depth histogram built up at step 210. Still another test may be whether more than some arbitrary number of formation dips, say, fifty, remain in the memory discussed in connection with step 200 which have not become members of zones. Note that if a zone passes each of the tests in step 218, it is accepted and its characteristics are stored at step 220. All of the members of the zone are then removed from the memory discussed in connection with step 200 so that it is left only with formation dips which have not been associated with accepted zones. Note additionally that an accepted zone typically contains formation dips which have been identified as trend dips interspersed with formation dips which happen to be within the depth limits of a zone but have not been identified as trend dips.

If a zone does not pass any of the tests at step 218, it is rejected, and any flags attached to the formation dips because of associating them with the failed zone are removed from the formation dips. This, of course, means that the second run through steps 202-218 should identify the same zone which will then be rejected. However, an additional test at step 218 is whether a zone has been identified before and rejected before. If that is the case, then the formation dips within that twice rejected zone are flagged as belonging to a gap between zones and are removed from the memory discussed in connection with step 200.

The next step is 222, at which a test is made to see if more zones can be sought, e.g., to see if enough formation dips remain in the memory discussed in connection with step 200 to justify seeking zones. If the answer is yes, the invented system returns to step 202, to go through steps 202-218 working this time only with the formation dips remaining in the memory 200, that is, those formation dips which have not been associated with zones and have not been removed for any of the other reasons discussed in connection with rejecting a zone at step 218. When there are no more zones to be found, as determined at step 222, the procedure goes to step 224 in FIG. 15 where the zones found as described above are ordered by increasing borehole depth. Now that the zones are known the system can produce at step 226 a map, such as on arrow plot paper, with respective map traces showing the dip magnitudes and dip azimuths of the structural dips of the respective zones, as well as, if desired, additional characteristics of the zones. Referring to FIG. 16 as an example of such map traces, the map coordinates resemble those of an arrow plot in that the dip magnitude is in the horizontal direction, to the right, and borehole depth is in the vertical direction, as marked. A zone A has a structural dip shown as a solid vertical line which is to the right of the origin by a distance corresponding to the structural dip magnitude and starts at a top level in the borehole and ends at a bottom level in the borehole as marked. Half way down the vertical line for zone A is a small circle and a short horizontal bar concentric with the circle having a horizontal length showing the 68% confidence limit of the structural dip magnitude, found, for example, at step 216 of FIG. 6. A sector or fan centered at the same point as the small circle and symmetrical with respect to the dip azimuth of the structural dip shows the 68% confidence limit of the structural dip azimuth, as found, for example, at the same step 216 of FIG. 6.

Note that if the horizontal bar indicating the 68% confidence limits on magnitude extends far enough to the left to include the zero dip magnitude, then the fan or circular sector becomes a full circle. Another zone B is shown in the same FIG. 16 and comprises map traces having similar meaning. The other traces on FIG. 16 will be discussed later.

Returning to FIG. 15, the invented system next considers the gaps between the zones identified as discussed above. There may be the following three kinds of gaps: (i) gaps containing formation dips which were initial candidates to be included in zones but were rejected for the criteria discussed in connection with step 218 of FIG. 6; (ii) gaps where no cluster of formation dips could be found (this includes gaps where the prevalent dip exhibits a smooth variation as well as gaps where there are chaotic changes in formation dips and no trend can be found); and (iii) gaps for which no formation dips have been produced (this includes gaps of zero thickness, i.e., a direct transition from one zone to the next).

It is important to find the nature of the earth formation in these gaps, particularly where the prevalent dip varies smoothly. Such smooth variation may occur in many ways, as can be deducted from a study of structural geology. One way, however, is most common, and this is variation along a planar trend. In such a situation, formation dips are so arranged that they are roughly parallel to the same line direction which is also the direction of their intersection. The "trend plane" in such a case is perpendicular to this direction. One example of this is illustrated in FIG. 16A which shows a hemispherical equal area map and a number of points representing formation dips which are within a planar gap. It is seen that they tend to be in the vicinity of an arc which, of course, defines the plane. One technique used in the invented system to seek planar trends is called variance analysis which involves identifying three orthogonal planes such that the sum of the squares of distances of the dip points in space to these planes is either a minimum or a maximum. If the found minimum is very small, the corresponding plane is the trend plane which is sought. To do this, the formation dips in a gap are retrieved from the memory discussed in connection with step 200 and variances and co-variances are found by summing squares and their products of their components over the depth interval of the gap. Then eigenvalues and eigenvectors of the results are found by known methods. They are then stored in decreasing order of eigenvalues. Eigenvalues are equal to the sums of the squares of distances of the dip points to the planes perpendicular to the corresponding eigenvectors. If the ratio of the least eigenvalue to the middle eigenvalue is smaller than an arbitrary chosen number, such as 0.5, it may be considered that a planar trend exists.

Figure 15:
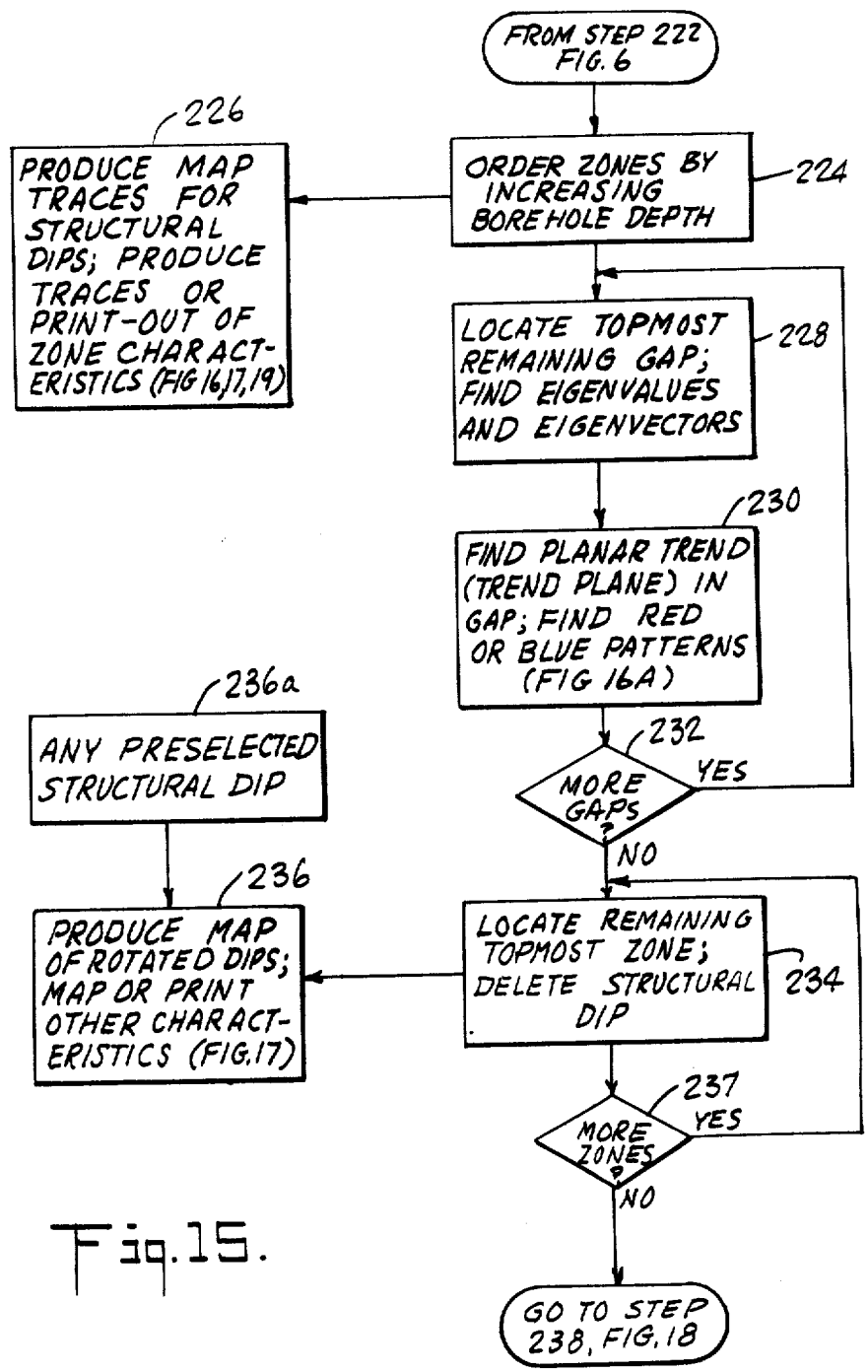
FIG. 15 is another flow chart showing other major steps in the operation of a system embodying the invention.
Figure 16:
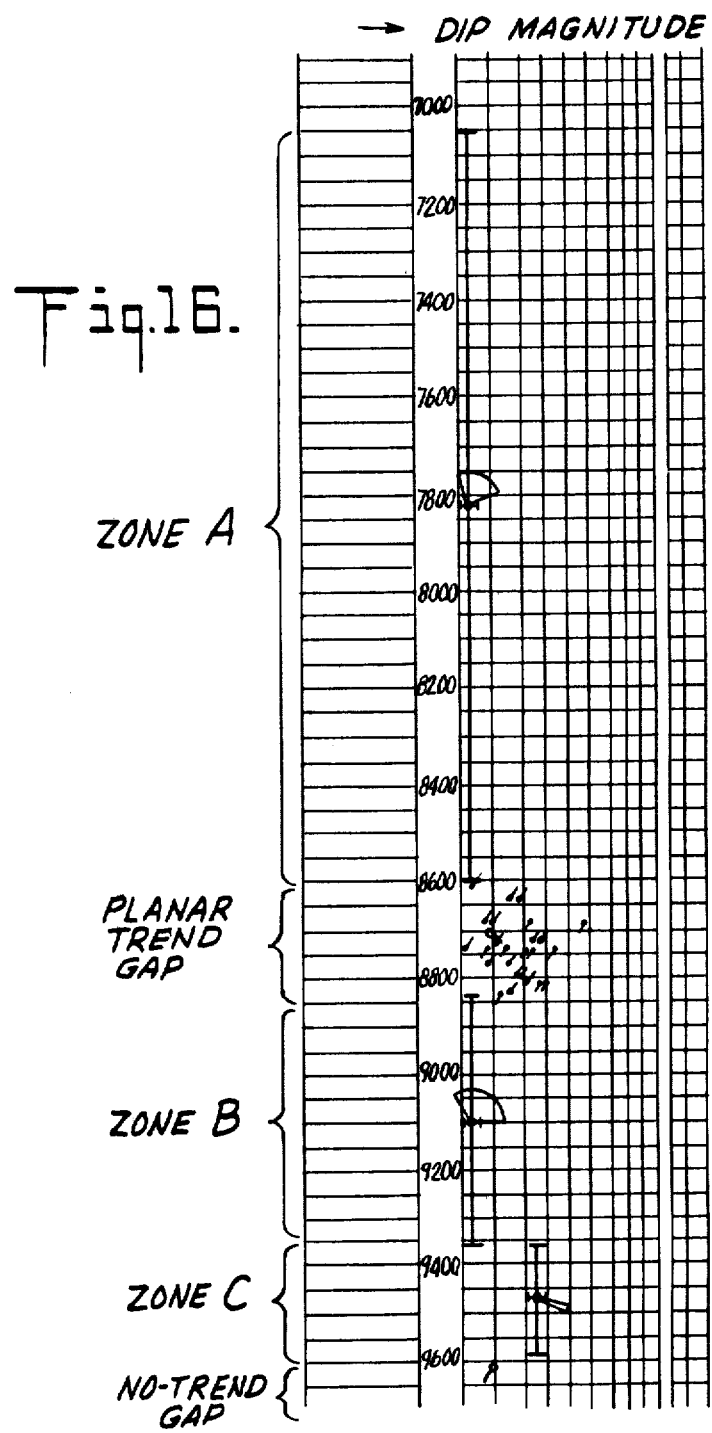
FIG. 16 is an illustration of a digest map produced in accordance with the invention.

Thus, at step 228 in FIG. 15, the topmost remaining gap is found by locating the depth interval in the borehole which is between the top of the topmost zone as the zones were ordered at step 224 and the bottom of the next lower zone, and the eigenvalues and eigenvectors of this gap are found as discussed above. Then at step 230 the planar trend or trend plane of that gap are found. Referring to FIG. 16A for an illustration, a convenient reference point on the trend plane is the so-called "plunge" or point of least dip magnitude in the trend plane. It can be identified as having the 90° compliment of the least eigenvector dip magnitude and the 180° opposite of its azimuth. Frequently, the plunge dip magnitude is small, such as of the order of a few degrees. The "image" of a dip vector is defined as the unit vector carried by the intersection between the trend plane and the plane containing the least eigenvector and the dip vector. Any dip point can now be defined in terms of two coordinates referred to the trend plane: the "right ascension" or angular distance measured from the plunge point to the image of the dip along the trend plane, and the "declination" or angular distance measured from the image dip in the trend plane to the dip itself, as illustrated in FIG. 16A. The least eigenvalue is the sum of squares of the signs of the declinations. As such it is regarded as a measure of the error made in assimilating the set of dips to the planar trend. A measure of dispersion of dip points about the trend plane is the average angle between the dip vector and its orthogonal projection in the plane. It can be found as the arc sine of the square root of the ratio of the least eigenvalue to the number of points in the gap. The right ascensions are equivalent to dip magnitudes with respect to the plunge dip. When a correlation coefficient is found between the order of appearance of right ascensions, from the least (or most negative) to the greatest, and their order of appearance along the borehole depth, if right ascensions are found to increase with depth, there is the equivalent of a so-called "red pattern" of sedimentary layers. If they decrease with increasing borehole depth, there is a "blue pattern" by the same rules. The correlation coefficient is positive and close to unity in the first case, and negative and close to negative unity in the second. Intermediate values represent various degrees of complexity between these two simple extremes. This search for pattern is also done at step 230.

In the next step, 232, the system finds if there are more gaps to be considered. If the answer is yes, the system returns to step 228.

If at step 228, it is determined that no single planar trend is present in the gap under consideration, then the principal eigenvector may be used to represent the overall dip in that gap while the principal eigenvalue may be used to represent its degree of dispersion. The dip magnitude and azimuth of the principal eigenvector may be found using known techniques. The measure of dispersion is the arc cosine of the square root of the ratio of the principal eigenvalue to the number of dips in the gap under consideration. This may be done at step 228 for the current gap under consideration.

Figure 17:
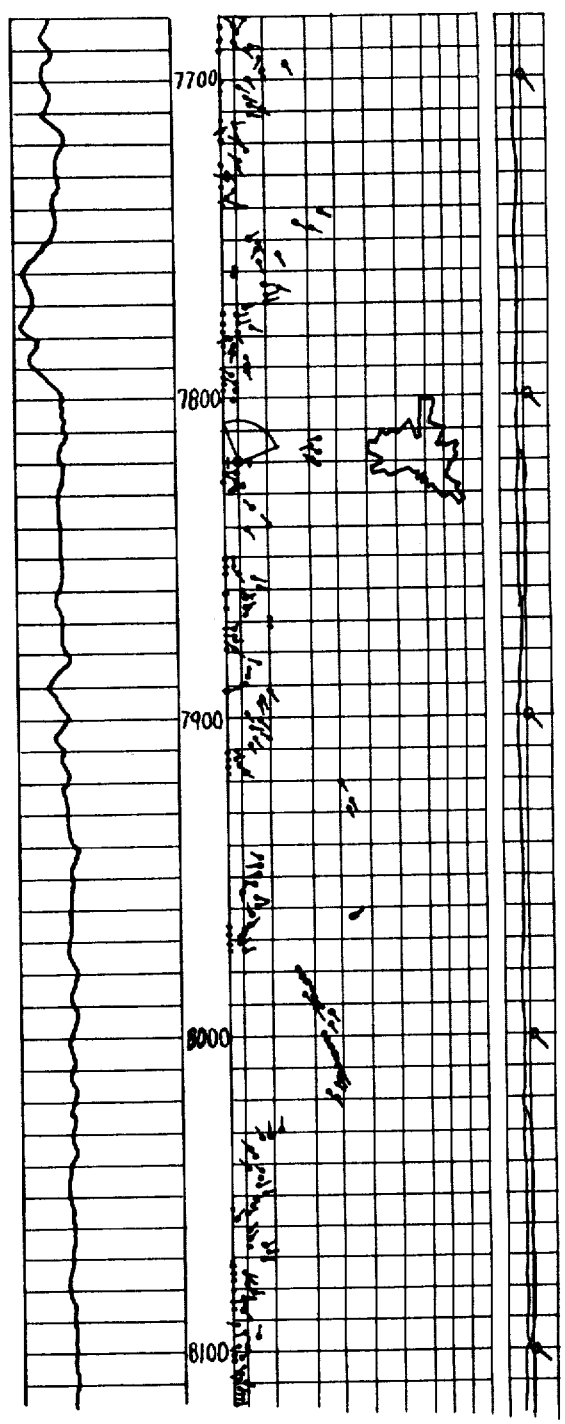
FIG. 17 is an example of a dual presentation map produced in accordance with the invention.

After all of the zones and gaps have been treated as discussed above, the invented system proceeds to step 234 to rotate the individual formation dips which happen to be within zones to account for the respective structural dips of the zones. The purpose is to arrive at individual formation dips which would show only sedimentary dip and not the structural dip resulting from the physical rotation of the original sedimentary layer through some geological process. Thus, at step 234, each individual formation dip having a depth which places it within a zone is combined with the rotation vector discussed in connection with step 214 so as to convert it into a rotated or relative dip. The resulting rotated dips are stored, also at step 234, and a map of the rotated dips and a map of print of other characteristics of the zones may be produced at step 236. The map may be as illustrated in FIG. 17. It contains the same kinds of traces discussed in connection with FIG. 16, and additionally contains arrow plot traces of the individual rotated formation dips found in step 234. In this arrow plot, the distance of a small circle from the left-hand margin represents the dip magnitude of a rotated dip. The vertical position of the small circle represents the depth in the borehole in which the dip occurs and the direction of the tail represents the dip azimuth of the rotated dip. In addition, in the same step 236, other characteristics of the zones may be mapped or printed out. For example, the values of the original and rotated formation dips may be mapped or printed out. Other characteristics which may be mapped or printed out at this stage include whether each particular formation dip which is shown was a trend dip or not. It is noted that it is possible in accordance with the invention to use structural dips for one or more of the zones which are different from those found in step 214 in the process of producing the map discussed in connection with step 236. Thus, there may be preselected structural dips for one or more of the zones which are provided at step 236a so that the map produced at step 236 would reflect those structural dips to the exclusion of the structural dips for the same zones provided from step 234. In this case, the mapped or printed out other characteristics of the zones produced at step 236 may include a trace indicating whether the structural dip for a given zone came from step 234 or from step 236a.

At the end of treating zone at step 234, an analysis may be made of the relative azimuths of formation dips which are within the zone but have not been found to be trend dips. Indeed, trend dips are close, by definition, to the structural dips in the zone and consequently have low values of relative dip magnitude. As a consequence, their dip azimuths are of a low degree of certainty and it is customary for this reason to leave them out of such azimuth frequency analysis. In addition, an equal area Schmidt map similar to the one discussed in connection with FIG. 5 may be created at this time at step 234 and mapped at step 236 for all of the rotated formation dips in the zone, including trend dips this time, as an additional help in visualizing the distribution of individual dips about the structural dip in the zone and as an additional clue to whether the structural dip found by the invented system is reasonable.

After a zone is treated at step 234, the system checks at step 237 if any more zones are to be treated, and, if so, returns to step 234. When all zones have been treated as described, the system goes to step 238 in FIG. 18. In the procedure illustrated in steps 238-244, the system starts with the equal area Schmidt map of all of the formation dips and finds patterns such as red and blue patterns through a panning process somewhat similar to the one discussed in connection with finding zones. More specifically, in step 238, the system pans the equal area map such as the one shown in FIG. 5 with a sectorial shaped window, such as a 3.6° window shown in FIG. 5 to find the position of the window in which it contains the greatest number of formation dips. The window is panned in samll steps, for example, one degree of one-half a degree. Once the most populous sector is located in this panning procedure, the system goes onto step 240 and examines the formation dips within this sector to find any strings of depth-contiguous formation dips. Again, a string may be considered to be any sequence of formation dips which follow each other in depth and no two adjacent members of the strings are separated from each other in depth by more than one or some other arbitrary small number of formation dips which are not within the sector. Once all strings within the sector have been located in step 240, the system goes on to step 242 to locate any red and blue sedimentary patterns in those strings. To do that, the system considers the strings in order of depth within each string. If dip magnitudes of the formation dips within a string or any portion of a string are found to increase with depth, the sequence of so-increasing dips is identified as a red pattern (see FIG. 13 for an illustration). If they are found to decrease with increasing depth, the sequence is identified as a blue pattern (FIG. 13). A correlation coefficient may be found to cover the intermediate cases. Then the system goes to step 243 to find if any more sectors remain in the equal area map and returns to step 238 if the answer is yes. When all sectors have been treated in this manner the system goes to stepp 244 to store the found characteristics of the located patterns. These characteristics include the top and bottom depths of the found patterns, the values of dip magnitudes and azimuths within each pattern and the correlation coefficients. These characteristics may be associated with a lighology file derived from other well logs, and may be the most directly interpretable in geological terms.

Plunging planar trends are not easily recognized on arrow plots because both magnitude and azimuth dip vary along the trend. Yet if the plunge is rotated out of such dips, all arrow tails become substantially parallel making the pattern of dips evident on a map of this kind. Two modes of presentations may be used for planar trend gaps in accordance with this invention. In the first mode, each dip in a planar trend gap is rotated by the amount of the plunge dip (see FIG. 16A). The effect of this is to present all dips within such a gap with substantially the same azimuth. If the planar trend is perfect, i.e., if the angular dispersion or the least eigenvalue is nil, all rotated dips share the same (or the opposite) azimuth at 90° to the azimuth of the plunge dip. If the trend is less than perfect, some azimuth variation will remain observable. In the second mode, the found values of right ascension may be shown as traces on a map, associated with azimuth at right angle to the azimuth of the plunge. A smaller trace may also be made to indicate the amount of declination, i.e., the departure of each individual dip point from the trend plane. If the planar trend is perfect, the two presentations would be identical since the declination symbols are all on the zero line.

Figure 19:
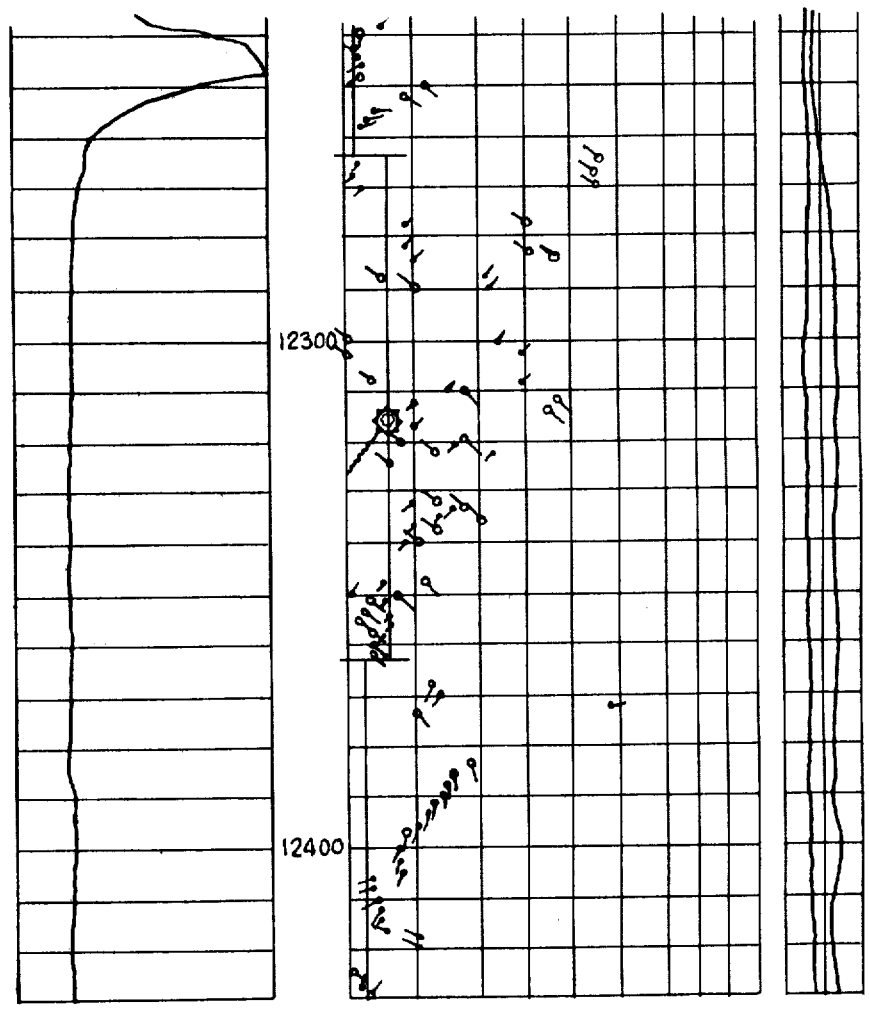
FIG. 19 is a map of a planar trend showing plunge, right ascensions and declinations relating to step 248 of FIG. 18.

Such rotation of the plunge of planar trend gaps is done by the system at step 246 and the desired map is produced at step 248. Such a map is illustrated in FIG. 19. In it, positive right ascensions are represented as arrows pointing to the azimuth of the plunge plus 90° and negative ones to the same azimuth less 90°. A procedure similar to the zoning discussed above in connection with FIG. 6 and the location of strings discussed in connection with steps 238-244 may be used to identify red and blue patterns within a planar trend gap. The procedure would be much simplified in this case since all dips within a planar trend gap share the same or the opposite azimuth and since all dips can be assumed to be consecutive within the same azimuth class. This procedure may be carried out by the invented system at step 250.

Some gaps may remain and, typically do, after all

Some gaps may remain and, typically do, after all the zones and all the planar trend gaps have been identified and treated as discussed above. Those remaining gaps are treated at step 252. Each of these gaps may be rotated by the amount of the principal eigenvector in the zone so as to convert the individual formation dips in such a gap to a rotated dip which accounts for what may be assumed to be a structural dip. However, since these gaps are so poorly organized that the eigenvector dip can only be regarded as a tentative value, the system can accommodate a selected rotation dip (which may be arbitrarily or otherwise selected by the operator of the system) to be provided from 253 and used in step 252 instead of the principal eigenvector.

At this time, some significant results of the process carried out by the invented system may be mapped or printed out at 254. These results may include the following characteristics of the underground formation:

(a) for each zone and each gap, the depth of the top and the bottom of the zone or gap and the Cartesian coordinates of each top and each bottom;

(b) for zones only, the structural dip (or the externally supplied one used in the rotation) in magnitude and azimuth as well as the probable errors in structural dip magnitude and azimuth, the dip scatter figure derived from all of the formation dips in the zone, in degrees (this dip scatter figure is used by analysts as an estimate of the energy of deposition of the medium); the average value of all dips in the zone; the degree of randomness of trend dips in the zone; the number of dips in the zone; and the number of trend dips in the zone;

(c) for planar trend gaps only, the plunge dip, in magnitude azimuth, a figure of angular dispersion about the trend plane, in degrees, the value of the least eigenvalue, and the depth to dip correlation coefficient;

(d) for gaps which are not planar trend gaps, the principal eigenvector dip magnitude and azimuth and the figure of angular dispersion about the principal eigenvector, in magnitude and azimuth.

Finally, at step 256, the system produces a map, typically on arrow plot paper, which may be a digest map and/or a dual plot map.

A digest map is illustrated in FIG. 16 and presents map traces as discussed above of two zones (a) and (b) discussed above and a third zone (c). Planar trends are shown on the digest map by an arrow-type symbol to show the plunge dip magnitude and azimuth and by conventional arrows to show the image dips. An exemplary planar trend gap is also illustrated on the digest map of FIG. 16. A gap which is not a planar trend gap is also illustrated by a single arrow symbol showing the dip of the principal eigenvector (it may ultimately be shown by a fan showing its dispersion in magnitude and azimuth). This new type of presentation shows at a glance the major structural features crossed by the borehole. It can be reduced by photography to an even smaller scale than the one shown and retain its usefulness.

As an alternative or an addition, the invented system may produce a dual presentation map, as in FIG. 17, showing on a detailed scale both the traces shown in the digest map of FIG. 16 and the rotated individual formation dips. In particular, zones, structural dips, dispersion figures, planar trend gaps and no trend gaps may be shown by the same traces as on the digest map but drawn to the larger scale of depths. Individual formation dips, as rotated in accordance with the discussion above, are shown by conventional tadpole traces at the places of rotated dip magnitudes and rotated dip azimuths. Azimuth frequency plots may be displayed in the high dip range of the arrow plot grid either including complete zones or following sub-division of zones into a homogeneous lithological units. In addition, special print-outs may be produced having histograms of dip occurrences versus azimuth as well as equal area cross-plots before and after rotation of the dips.

In one embodiment of the invention the process discussed above can be carried out as a computer-implemented process, with the assistance of a suitably configured system within the family of component configurations available from the Digital Equipment Corporation under the generic designation PDP-10. Of course, the configuration should include memory circuits having sufficient capacity to store signals corresponding to the log and dip characteristics discussed above, and a sufficient number of CPU and related components and boards suitably configured to carry out the steps discussed above. In such an embodiment of the invention, each of the steps discusses in connection with FIGS. 6, 15 and 18 may be described by one or a few statements in a high order language such as Fortran, and available compiler system can be used, as is common in the art, to create from the list of statements, machine language instruction signals in the form of magnetic signals on disc or tape or electrical signals stored in suitable memory circuits, such as registers in firmware memory chips or boards. The description above is sufficient to enable a person of ordinary skill in the art to create, without undue experimentation, a suitable set of high level language instructions appropriate for a chosen computer system configuration, and to create on the basis thereof, in a manner known in the art and by following the disclosure of the invention above, the requisite set of machine language instruction signals stored in circuits or devices suitable for the chosen computer system configuration.

In order to keep this specification concise and to minimize superfluous information, no detailed set of high level statements (or a representation of machine language signals) is detailed here. However, a person of ordinary skill in the art can expand the above description into such a set of statements or machine language signals by using routine skills and following the description of the invention above. For example, in each of steps 202, 204 and 206 of FIG. 6 the building of an equal area map can be done in accordance with a Fortran statement or statements which define the coordinate boundaries of cells and the comparison of the coordinates of a formation dip with the cell boundaries in order to classify a given formation dip as belonging to a particular cell. Once the classification of a formation dip is found the cell to which it belongs can then be stored in a memory circuit as a part of the characteristics of a given formation dip. The so stored characteristics of formation dips may then be sorted, using known techniques, to order the formation dips into respective sequences corresponding to the respective cells of the equal area map of interest. After such sorting, the most populous partition in the map of interest can be found by comparing the lengths of the sequences into which the formation dips have been sorted. The longest sequence is of course that for the most populous cell. Similarly, if what is looked for is the most populous multicell partition, that partition which is made up of the sequences which together add up to the greatest length is the most populous one. Ambiguities which arise when two or more partitions are equally populous may be resolved in any convenient way. For example, the most recently identified one of a plurality of partitions which are equally populous may be labelled as the most populous one. In step 208 the building up of a depth histogram may be by known sorting by depth of the formation dips which are within the selected map partition, and by building up a count of the number of occurrences of formation dips within each depth interval of a selected length, say ten feet. At step 210 a zone within the histogram can be found by having the system start at one end of the histogram and search for the first occurrence of a preset number of empty histogram cells, for example two empty ones, and by labelling the last populated histogram cell before the sequence of empty ones as the zone boundary, and then proceeding to determine if a zone is acceptable as discussed above. At step 212 the requisite mimimatrix may be built, and the requisite trend dips partition found using techniques similar to those discussed in connection with steps 202, 204 and 206, particularly since the fine partition cell of each formation dip is a part of its characteristics as found in step 206. At step 214 the structural dip and rotational vector can be found by combining the vector coordinates of the unit vectors of trend dips using known vector summing techniques, particularly since the vector coordinates of the individual trend dips are available as part of the dip characteristics stored at step 200, and the coordinates of the resultant rotation vector can be expressed in dip azimuth and magnitude terms or in other convenient terms. At step 216 the randomness measure and other zone characteristics can be found, as discussed above in connection with FIGS. 6 and 14 or in other known ways by following the description above. At step 220 the zone characteristics discussed above may be stored in suitable memory circuits or devices, in the form of magnetic or electrical signals and the zone members can be remoed from the storage device or circuits in which the complete list of formation dips was stored at step 200, using known techniques for such removal.

Figure 18:
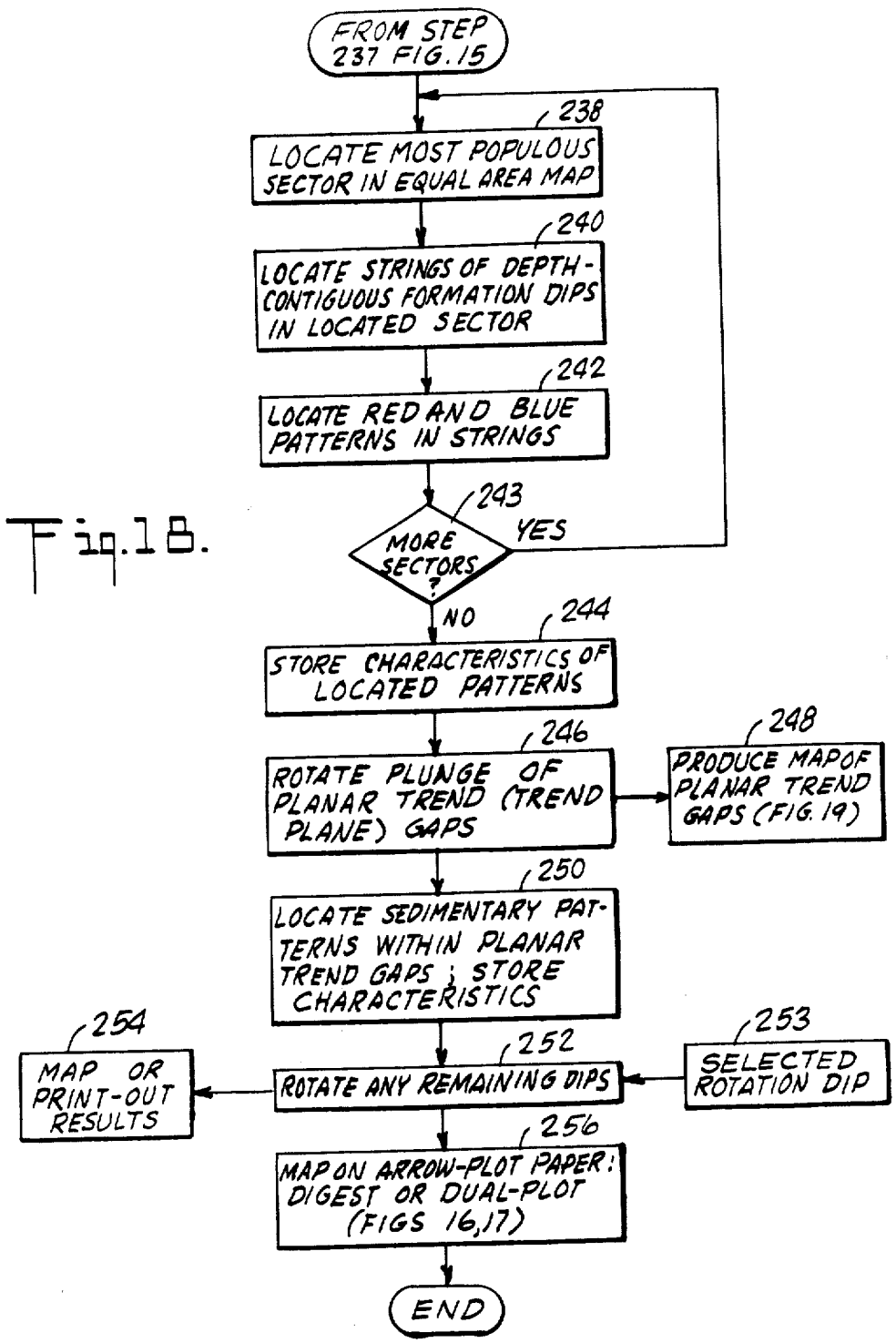
FIG. 18 is another flow chart showing some other major steps carried out by a system embodying the invention.

Similarly, known techniques can be used in following the description of the invention above to order the zones by increasing borehole depth as required at step 224, FIG. 18. Since the zone characteristics have been stored in suitable devices or memory circuits at steps 220 and since the zone characteristics include an identification of the depth of the topmost formation dip of a zone, the ordering at step 224 can use known sorting techniques in following the teaching of the invention above. The requisite map traces at step 226 can be produced by using the combination of the computer system configuration used above and a suitable printing or plotting device such as a Versatec printer or a Calcomp plotter which convert the electrical or magnetic signals representing zone characteristics into electrical signals for driving the printing or plotting devices required to create a visible map traces of the shape dictated by the stored zone characteristics, as illustrated at FIGS. 16, 17 and 19. At step 228 the topmost gap can be located by checking the histogram cells to locate the one immediately following the topmost zone in the order of zones formed at step 224 and, in succeeding runs through step 228, to locate the next topmost gap. The eigenvalues and eigenvectors at step 228 can be found by combining the relevant characteristics of the formation dips within a gap in accordance with the expressions discussed above connected with eigenvalues and eigenvectors for the unit vectors corresponding to formation dips. Of course the found eigenvalues and eigenvectors are stored in suitable locations in the memory devices or memory circuits discussed above. At step 230 the required planar trend can be found using known techniques in accordance with the description of the invention above and the found characteristics of the planar trend stored in the memory devices or circuits discussed above. Red or blue patterns within the gap of interest can be found by using known sorting techniques to sort the dips as required by the above description of the invention. For example, a sorting technique can be used to locate any string within a gap which consists of depth adjacent formation dips which have magnitudes which either increase or decrease substantially monotonically. At step 234 the topmost remaining zone in the order of zones formed at step 244 is found using known techniques to follow the teaching of the invention above. For example, the topmost zone in the order found at step 224 is located and the structural dip of the individual formation dips within the zone is deleted by subtracting the components of the structural dip vector from the components of the unit vectors associated with each formation dip within the zone. The zone is then flagged as having been processed in step 234 and the procedure is repeated for the next remaining zone in the order found in step 224. The desired map traces or prints at step 236 are produced as described in connection with step 226. The structural dip to be mapped at step 236 may come from the storage for the structural dip found at step 214 or, in the alternative, it may come from a storage device or circuit storing a preselected structural dip as indicated at step 236A. Similarly, the structural dip deleted at step 234 may be the structural dip found at step 214 for the relevant zone or it may be a preselected structural dip coming from a suitable storage device or circuit.

Still similarly, the operations required at step 238 in FIG. 18 may be carried out by a sorting technique which starts by establishing angular sectors in an equal area map, for example 3.6° angular sectors or windows and comparing the dip magnitude angle of the formation dips which are within gaps identified in step 228 which have dip azimuth characteristics within the angular bounds of a given window or sector, and then comparing the number of formation dips within the respective sectors so as to find the sector or window containing the greatest number of formation dips. At step 240 known sorting techniques can be used to follow the teachings of the invention to locate strings of depth continuous formation dips in a given sector, and similarly, in step 244, known sorting and comparison techniques can be used in accordance with the teachings of the invention to locate depth adjacent formation dips within a windor or sector which have substantially monotonically increasing or substantially monotonically decreasing dip magnitude angles to thereby identify red and blue patterns and to store signals identifying the located patterns in step 244. The plunge of the planar trend in step 246 can be found by processing the characteristics of the formation dips within a gap in accordance with the expressions discussed above and the map of the planar trend gaps can be produced at step 248 in a manner similar to that discussed in connection with step 226. The sedimentary patterns within a planar trend gap may be located in step 250 using techniques similar to those discussed in connection with steps 242 and 230 and the characteristics of such sedimentary patterns can be stored in suitable storage devices or circuits. Any remaining dips may be rotated in step 252 either by using a selected rotation dip stored at step 253 in a suitable memory device or circuit or by using the structural dip of the nearest zone or an average of the nearest flanking zones, in the manner discussed in connection with step 234. The map traces of the structural dip used in the rotation of step 252 and/or of the rotated and original dips can be produced at step 254 using the technique discussed in connection with step 226. Similarly, the visible map traces required at step 256 can be produced as discussed in connection with step 226.

In addition to the embodiment of the invention using a suitable configuration of memory circuits and CPU and related circuits and circuit boards discussed above, it will be clear to persons skilled in the art that some or all of the functions discussed above can be implemented by way of special purpose circuits interconnected to carry out the functions described above in a way which does not allow for convenient change in function by way of changing machine language instruction signals stored in magnetic or electrical form in suitable storage devices or circuits. It should also be clear that various other modifications and changes will occur to those skilled in the art while following the teaching of the invention discussed above and without departing from the scope of said teaching.

I claim:

1. A well logging method of producing a map showing the structural dips of depth zones of earth formations adjacent a borehole comprising the following machine-implemented steps:

deriving formation dips at a succession of closely spaced depth levels in a borehole from well log outputs of measuring devices carried on a dipmeter tool passed through the borehole;

filtering the formation dips into a plurality of non-overlapping depth zones each encompassing a number of formation dips most, but not necessarily all of which are mutually consistent within the respective zone, wherein the depth extent of a zone is not preset, but is determined by the depth extent of the mutually consistent formation dips making up the zone;

finding, from at least selected ones of the formation dips in the respective depth zones, the respective structural dips of the respective zones; and identifying the respective structural dips of the last recited zones, and producing respective traces on a map indicative of the last recited dips.

2. A method as in claim 1 including the machine-implemented steps of rotating the formation dips which are within said depth zones to account for the respective structural dips of the zones and adding, to said map, traces showing the resulting rotated formation dips at positions which are depth matched to the traces showing the structural dips.

3. A method as in claim 1 or 2 including the machine-implemented step of combining at least selected ones of the dips within the respective zones, deriving confidence limits of dip magnitude and dip azimuth for the respective structural dips on the basis of the combined dips and showing said confidence limits by way of traces on said map juxtaposed with said traces showing dip magnitude and dip azimuth of the respective structural dips.

4. A method as in claim 1 or 2 including the machine-implemented step of locating dip patterns in the respective depth zones which correspond to selected sedimentary patterns, including blue and red sedimentary patterns, and producing tangible representations showing the kind and characteristics of the located sedimentary patterns.

5. A well logging method comprising the following machine-implemented steps of exploring subsurface formations:

deriving formation dips which are for respective closely spaced depth levels in a borehole intersecting subsurface formations and are consistent with logs taken therein;

filtering the formation dips to find groups thereof each of which extends over a respective depth zone in the borehole and in each of which at least most, but not necessarily all, of the formation dips tend to share a respective common dip component which is likely to correspond to the structural dip of the subsurface formations in the respective borehole depth;

wherein the depth extent of a zone is not preset, but is determined by the depth extent of the respective group of the formation dips sharing the respective common dip component; and identifying, and producing a tangible record of, said subsurface zones and the respective structural dips therein.

6. A well logging method as in claim 5 in which the filtering comprises building successive maps of the distribution of formation dips in dip magnitude versus dip azimuth space, wherein a succeeding map is to a finer resolution than a preceding map and covers a lesser range of dips than the preceding map and is centered at the most populous partition of the preceding map, and finding said zones on the basis of formation dips in a selected most populous partition of the latest successive map.

7. A well logging method as in claim 6 in which said finding of zones on the basis of formation dips in the most populous partition of the latest successive map comprises building a depth histogram from the last recited formation dips, finding zone on the basis of said histogram, said zone being characterized by a succession of formation dips in which depth-adjacent dips are within a selected distance from each other and the dips are mutually consistent within a selected limit.

8. A well logging method as in claim 7 including finding said common dip component for the last recited zone from a selected subset of the dips in the last recited most populous partition.

9. A well logging method as in claim 8 in which said finding of the last recited common dip component for a zone comprises finding trend dips which are the dips within the most populous subpartition of the last recited partition of the latest successive map and combining said trend dips in three dimensional space to thereby produce said common dip component.

10. A well logging method as in claim 9 including removing the respective structural dip components from the formation dips within the respective depth zones to thereby produce rotated formation dips which tend to correspond to the dips of stratigraphic earth formation features prior to tectonic movement thereof.

11. A well logging method as in any one of claims 5-10 including finding planar trends from the formation dips which are not included in said zones and producing a tangible record of selected parameters of said planar trends.

12. A well logging method as in claim 11 including the step of finding at least one of blue and red stratigraphic patterns within said planar trends and producing a tangible record thereof.

13. A well logging method as in claim 12 including finding the plunge of said patterns and producing a tangible record thereof.

14. A well logging method as in claim 13 including removing said plunge from the formation dips within said patterns to thereby produce therefrom rotated dips corresponding to the attitudes of corresponding stratigraphic subsurface features therein prior to tectonic movement thereof.

15. A well logging method as in claim 5 including removing the respective structural dip components from the formation dips within the respective depth zones to thereby produce rotated formation dips which tend to correspond to the dips of stratigraphic earth formation features prior to tectonic movement thereof.

16. A well logging method as in claim 5 including finding planar trends from the formation dips which are not included in said zones and producing a tangible record of selected parameters of said planar trends.

17. A well logging method as in claim 16 including finding the respective plunge of the respective planar trends and producing a tangible record thereof.

18. A well logging method as in claim 16 including finding blue and red stratigraphic patterns within said planar trends and producing a tangible record thereof.

19. A well logging method as in claim 18 including finding the respective plunge of said red and blue stratigraphic patterns, removing the respective plunge from the formation dips within the respective patterns to thereby produce rotated dips therefrom, and producing a tangible record of the last recited rotated dips.

20. A well logging method as in claim 16 in which said finding of a planar trend comprises building a Schmidt map of the distribution, in dip magnitude versus dip azimuth space, of the formation dips which are not within said zones, selecting the most populous angular sector of a selected size within the last recited map, finding in said sector a string of formation dips characterized by (i) formation dips which are depth contiguous within selected criteria and (ii) formation dips which are mutually consistent within selected criteria, and producing a tangible representation of a planar trend consistent with the last recited string of formation dips.

21. A well logging method as in claim 5 in which said tangible record of zones and structural dips comprises a visible trace on a record medium having borehole depth versus dip magnitude coordinates, wherein the trace for a zone comprises a straight line extending from the top to the bottom of the zone at a position on the dip magnitude coordinate corresponding to the structural dip of the zone, together with a visible indication of the azimuth of the structural dip of the zone.

22. A well logging method as in claim 21 in which said visible record of the structural dip for a zone includes a visible graphic indication of the confidence limit on the structural dip magnitude and a visible indication of the structural dip azimuth and the confidence limit thereon.

23. A well logging method comprising the following machine-implemented steps:
deriving formation dips which are for respective depth levels in a borehole depth interval and are consistent with logs taken therein;
filtering the formation dips to find respective common dip components for respective groups of formation dips which are likely to correspond to respective planar trends in respective non-overlapping depth zones of the subsurface formation within said depth interval; and
producing a tangible record of said planar trends.

24. A well logging method as in claim 23 including finding blue and red stratigraphic patterns within said planar trends and producing a tangible record thereof.

25. A well logging method as in claim 24 including finding the respective plunge of the respective planar trends and producing a tangible record thereof.

26. A well logging method as in claim 25 including removing the respective plunge from the formation dips in the respective planar trends to thereby produce therefrom rotated formation dips corresponding to the attitudes of the respective subsurface features prior to tectonic movement thereof.

27. A well logging method as in claim 23 including finding the respective plunge for each respective planar trend and producing a tangible record thereof.

28. A well logging method as in claim 27 including removing the respective plunge from the formation dips within the respective planar trends to thereby produce therefrom rotated formation dips which are likely to correspond to the attitudes of the respective subsurface features prior to tectonic movement thereof.

29. A well logging method as in claim 23 in which said tangible record comprises a visible arrow plot on a record medium in which the arrows for formation dips retain the dip magnitude of the original formation dips but have their azimuth indication corrected to remove therefrom the plunge of the respective planar trend and including an arrow of different characteristics for the dip magnitude and azimuth of the plunge for the respective planar trend.

30. A well logging method as in claim 23 including filtering the formation dips to find zones other than planar trends in which the formation dips have respective common dip components which are likely to correspond to the structural dips of the respective zones, and producing a tangible record of said zones and structural dips thereof.

31. A well logging method comprising the following machine-implemented steps:
logging a borehole depth interval with a dipmeter tool and deriving therefrom formation dips which are for respective depth levels in the borehole and are consistent with the dipmeter logs;
filtering the formation dips to find non-overlapping depth zones within said borehole depth interval, wherein the depth extent of each respective zone is determined by finding a sequence of formation dips having a common dip component which is likely to correspond to the structural dip of the respective zone; and
producing a tangible record of said zones and likely structural dips.

32. A well logging method as in claim 31 including filtering the formation dips to find planar trends in the subsurface formation logged by said dipmeter tool which are not included in said zones and producing a tangible record of selected parameters of said planar trends.

33. A well logging method comprising the following machine-implemented steps:
logging a borehole with a dipmeter tool and deriving therefrom formation dips which are for respective closely spaced depth levels in the borehole and are consistent with said dipmeter logs;

filtering the formation dips to find respective common dip components for respective groups of formation dips which are likely to correspond to respective planar trends of respective non-overlapping depth zones in the subsurface formation; and producing a tangible record of said planar trends.

34. A well logging method as in any one of claim 31-33 in which said tangible record comprises a visible log trace on a record medium.

35. A well logging system comprising:
first means for deriving formation dips which are for respective depth levels in a borehole depth interval and are consistent with logs taken therein; and
second means for filtering the formation dips to find respective non-overlapping depth zones within said borehole depth interval, wherein the depth extent of each respective zone is determined by the depth extent of a sequence of formation dips having a common dip component which is likely to correspond to the structural dip of the respective zone and for producing a tangible record of said zones and structural dips.

36. A well logging system as in claim 35 in which the second means includes means for further filtering of the formation dips to find, from formation dips which are not included in said zones, planar trends of subsurface formations and for producing a tangible record of selected parameters of said planar trends.

37. A well logging system comprising:
means for derving formation dips which are for respective depth levels in a borehole and are consistent with logs taken therein; and
means for filtering the formation dips to find respective common dip components for respective groups of formation dips which are likely to correspond to respective planar trends respective non-overlapping depth zones in the subsurface formations and for producing a tangible record of said planar trends.

38. A well logging system as in any one of claims 35-37 in which said tangible record comprises one or more visible logs on a record medium.

39. A process for improving dipmeter logs confused by the unseparated influence of structural dip, due to geological processes such as tectonic movements, and stratigraphic dip, due to geological processes such as depositional and/or erosional events, said logs being derived from the outputs of a dipmeter tool passed through a borehole interval intersecting subsurface formations likely to have been subjected to both kinds of geological processes, comprising the following machine-implemented steps:
finding the respective structural dip component of the dips of subsurface formations in respective non-overlapping zones in said borehole interval which are likely to have undergone geological processes such as tectonic movements; and
filtering the respective structural dip component from the respective dips to thereby produce an improved dipmeter log in which the confusing influence of structural dip is reduced and the stratigraphic dip influence is emphasized.

40. A process as in claim 39 in which the finding of the structural dip in a zone comprises building successive maps of the distribution of formation dips in dip magnitude versus dip azimuth space, wherein a succeeding map is to a finer resolution than a preceding map and covers a lesser range of dips than the preceding map and is centered at the most populous partition of the preceding map, and finding said zone on the basis of formation dips in a selected most populous partition of the latest successive map.

41. A well logging method as in claim 39 or 40 including the machine-implemented step of finding planar trends in subsurface formations which are not included in said zones.

42. A process as in claim 39 or 40 including the machine-implemented step of producing a record medium trace of said improved dipmeter logs.

* * * * *